US012030302B2

(12) United States Patent
Uemura et al.

(10) Patent No.: US 12,030,302 B2
(45) Date of Patent: Jul. 9, 2024

(54) LIQUID EJECTING APPARATUS, METHOD FOR CONTROLLING LIQUID EJECTING APPARATUS, AND NON-TRANSITORY COMPUTER-READABLE STORAGE MEDIUM STORING PROGRAM FOR CONTROLLING LIQUID EJECTING APPARATUS

(71) Applicant: Seiko Epson Corporation, Tokyo (JP)

(72) Inventors: Naoki Uemura, Suwa (JP); Masaki Miyazawa, Matsumoto (JP); Hirohisa Adachi, Matsukawa-machi (JP); Hiroyuki Kosuge, Matsumoto (JP); Yuto Suzuki, Shiojiri (JP); Shunpei Yamaguchi, Ota-ku (JP); Hironori Matsuoka, Matsumoto (JP); Hiroshi Shiobara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 268 days.

(21) Appl. No.: 17/648,332

(22) Filed: Jan. 19, 2022

(65) Prior Publication Data

US 2022/0234368 A1 Jul. 28, 2022

(30) Foreign Application Priority Data

Jan. 22, 2021 (JP) ................................. 2021-008344

(51) Int. Cl.
*B41J 11/00* (2006.01)
*B41J 13/02* (2006.01)

(52) U.S. Cl.
CPC ...... *B41J 11/00222* (2021.01); *B41J 11/0024* (2021.01); *B41J 13/02* (2013.01)

(58) Field of Classification Search
CPC .... B41J 11/00222; B41J 11/0024; B41J 13/02
See application file for complete search history.

(56) References Cited

U.S. PATENT DOCUMENTS 6,168,269 B1 * 1/2001 Rasmussen ................ B41J 2/01
347/102

FOREIGN PATENT DOCUMENTS

| | | | |
|---|---|---|---|
| JP | 2009241309 A * | 10/2009 | ............ B41J 11/002 |
| JP | 2010-240916 | 10/2010 | |
| JP | 2020-040225 | 3/2020 | |

* cited by examiner

*Primary Examiner* — Justin Seo
(74) *Attorney, Agent, or Firm* — WORKMAN NYDEGGER

(57) ABSTRACT

A recording system includes a transportation unit that transports a paper sheet, an ejection unit that ejects an ink, a heating unit that heats the paper sheet, a discharge unit to which the paper sheet is discharged, and a control unit. The control unit specifies an amount of ejection of the ink from the ejection unit. The control unit also controls an operation of the heating unit such that an undried region where the ink on the paper sheet is not dried and a dried region where the ink on the paper sheet is dried are formed on the paper sheet. Then, the control unit controls a transporting operation by the transportation unit such that the paper sheet on which the dried region and the undried region are formed is discharged to the discharge unit.

19 Claims, 20 Drawing Sheets

LIQUID EJECTING APPARATUS, METHOD FOR CONTROLLING LIQUID EJECTING APPARATUS, AND NON-TRANSITORY COMPUTER-READABLE STORAGE MEDIUM STORING PROGRAM FOR CONTROLLING LIQUID EJECTING APPARATUS

The present application is based on, and claims priority from JP Application Serial Number 2021-008344, filed Jan. 22, 2021, the disclosure of which is hereby incorporated by reference herein in its entirety.

BACKGROUND

1. Technical Field

The present disclosure relates to a liquid ejecting apparatus, a method for controlling a liquid ejecting apparatus, and a non-transitory computer-readable storage medium storing a program for controlling a liquid ejecting apparatus.

2. Related Art

An image forming device described in JP-A-2020-40225 controls decurl of a paper sheet by causing a temperature adjusting section to adjust temperature distribution on the paper sheet such that a temperature in a region on the paper sheet having a high water content is higher than a temperature in a region on the paper sheet having a low water content. The adjustment is conducted by blowing hot air to the paper sheet having the high water content as a whole and not blowing the hot air to the paper sheet having the low water content as a whole, for example.

The configuration according to JP-A-2020-40225 dries the entire paper sheet, and is therefore liable to consume a large amount of energy for drying.

SUMMARY

A liquid ejecting apparatus of the present disclosure is a liquid ejecting apparatus including: a transportation unit that transports a sheet in a direction of transportation; an ejection unit that ejects a liquid to the sheet; a heating unit that heats the sheet to which the liquid is ejected; a discharge unit to which the heated sheet is discharged; and a control unit that controls, based on information inputted, the transportation unit, the ejection unit, and the heating unit. The control unit specifies an amount of ejection of the liquid from the ejection unit, controls an operation of the heating unit such that an undried region where the liquid on the sheet is not dried and a dried region where the liquid on the sheet is dried as compared to the liquid in the undried region are formed on the sheet, and controls a transporting operation by the transportation unit such that the sheet on which the dried region and the undried region are formed is discharged to the discharge unit.

A method for controlling a liquid ejection apparatus of the present disclosure is a method for controlling a liquid ejecting apparatus including a transportation unit that transports a sheet in a direction of transportation, an ejection unit that ejects a liquid to the sheet, a heating unit that heats the sheet to which the liquid is ejected, a discharge unit to which the heated sheet is discharged, and a control unit that controls, based on information inputted, the transportation unit, the ejection unit, and the heating unit, the method including: specifying an amount of ejection of the liquid from the ejection unit; ejecting the liquid from the ejection unit to the sheet; controlling an operation to heat the sheet by the heating unit such that an undried region where the liquid on the sheet is not dried and a dried region where the liquid on the sheet is dried as compared to the liquid in the undried region are formed on the sheet; and controlling a transporting operation by the transportation unit such that the sheet on which the dried region and the undried region are formed is discharged to the discharge unit.

A non-transitory computer-readable storage medium storing a program of the present disclosure is a non-transitory computer-readable storage medium storing a program for controlling a liquid ejecting apparatus including a transportation unit that transports a sheet in a direction of transportation, an ejection unit that ejects a liquid to the sheet, a heating unit that heats the sheet to which the liquid is ejected, a discharge unit to which the heated sheet is discharged, and a control unit that controls, based on information inputted, the transportation unit, the ejection unit, and the heating unit, the program causing a computer to execute a process including: specifying an amount of ejection of the liquid from the ejection unit; ejecting the liquid from the ejection unit to the sheet; controlling an operation to heat the sheet by the heating unit such that an undried region where the liquid on the sheet is not dried and a dried region where the liquid on the sheet is dried as compared to the liquid in the undried region are formed on the sheet; and controlling a transporting operation by the transportation unit such that the sheet on which the dried region and the undried region are formed is discharged to the discharge unit.

DESCRIPTION OF EXEMPLARY EMBODIMENTS

Figure 1:
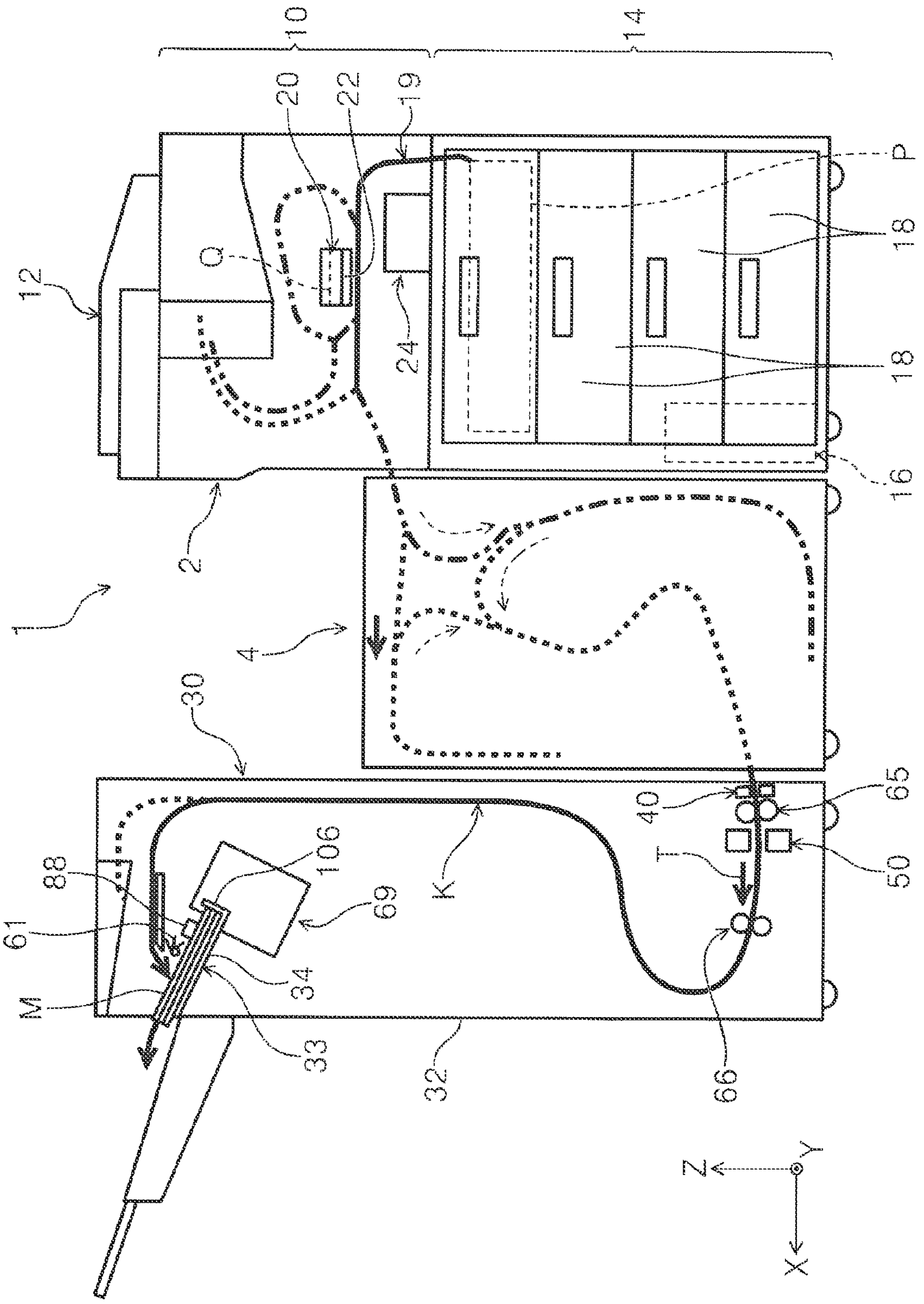
FIG. 1 is an overall view of a recording system of Embodiment 1.

An outline of the present disclosure will be described below.

A liquid ejecting apparatus according to a first aspect of the present disclosure includes: a transportation unit that transports a sheet in a direction of transportation; an ejection unit that ejects a liquid to the sheet; a heating unit that heats the sheet to which the liquid is ejected; a discharge unit to which the heated sheet is discharged; and a control unit that controls, based on information inputted, the transportation unit, the ejection unit, and the heating unit. The control unit specifies an amount of ejection of the liquid from the ejection unit, controls an operation of the heating unit such that an undried region where the liquid on the sheet is not dried and a dried region where the liquid on the sheet is dried as compared to the liquid in the undried region are formed on the sheet, and controls a transporting operation by the transportation unit such that the sheet on which the dried region and the undried region are formed is discharged to the discharge unit.

According to this aspect, formation of the dried region on the sheet enhances rigidity of the sheet against a force in the direction of transportation as compared to a configuration in which the entire sheet is formed into an undried region. Accordingly, it is possible to suppress partial buckling of the sheet when the sheet is discharged to the discharge unit. Moreover, since there is the unheated region on the sheet, it is possible to reduce energy consumption used for heating the sheet as compared to a configuration in which the entire sheet is heated by the heating unit.

In a liquid ejecting apparatus of a second aspect according to the first aspect, the control unit changes the amount of ejection of the liquid from the ejection unit depending on a capacity of the heating unit.

According to this aspect, it is possible to prevent or reduce insufficient drying of the dried region by the heating unit when a large amount of the liquid is ejected, thus improving the rigidity of the sheet appropriately.

In a liquid ejecting apparatus of a third aspect according to the first aspect, the control unit changes a heating quantity from the heating unit depending on the amount of ejection of the liquid from the ejection unit.

According to this aspect, the heating quantity from the heating unit is changed depending on the amount of ejection of the liquid from the ejection unit. Thus, it is possible to form the dried region appropriately while maintaining recording quality, and to appropriately improve the rigidity of the sheet.

In a liquid ejecting apparatus of a fourth aspect according to any one of the first to third aspects, the dried region and the undried region are arranged in a width direction orthogonal to the direction of transportation.

According to this aspect, it is possible to enhance the rigidity of the sheet against a force in the direction of transportation.

In a liquid ejecting apparatus of a fifth aspect according to any one of the first to fourth aspects, the dried region and the undried region are arranged in the direction of transportation.

According to this aspect, the dried region is formed at a portion of the sheet downstream or upstream in the direction of transportation. Thus, when a downstream end portion or an upstream end portion of the sheet comes into contact with the discharge unit or other mounting portions, it is possible to suppress buckling of the end portion of the sheet since the rigidity of the sheet against the force in the direction of transportation is enhanced.

In a liquid ejecting apparatus of a sixth aspect according to the fifth aspect, the liquid ejecting apparatus further includes: a post-processing unit that performs post-processing on the sheet at the discharge unit, in which the heating unit is disposed between the ejection unit and the discharge unit in the direction of transportation, and the dried region is unevenly located downstream of a center in the direction of transportation of the sheet.

According to this aspect, the rigidity against the force in the direction of transportation is enhanced at a portion downstream of the center of the sheet. Thus, it is possible to suppress buckling of the sheet when the downstream end portion of the sheet comes into contact with the discharge unit.

In a liquid ejecting apparatus of a seventh aspect according to the fifth aspect, the discharge unit includes an alignment plate provided upstream in the direction of transportation and configured to align an end portion of the sheet, a paddle is disposed to pull the sheet at the discharge unit back to upstream in the direction of transportation and cause the sheet to be in contact with the alignment plate, and a post-processing unit is disposed to perform post-processing on the sheet at the discharge unit, the heating unit is disposed between the ejection unit and the discharge unit in the direction of transportation, and the dried region is unevenly located upstream of a center in the direction of transportation of the sheet.

According to this aspect, the rigidity against the force in the direction of transportation is enhanced at a portion upstream of the center of the sheet. Thus, it is possible to suppress buckling of the sheet when the upstream end portion of the sheet comes into contact with the alignment plate.

In a liquid ejecting apparatus of an eighth aspect according to the seventh aspect, the control unit controls an operation to heat the sheet by the heating unit such that a location where the paddle is in contact with the sheet is included in the dried region in the direction of transportation and in a width direction orthogonal to the direction of transportation.

According to this aspect, the location where the paddle is in contact with the sheet is included in the dried region, and the rigidity of a region of the sheet that is in contact with the paddle is enhanced. Hence, it is possible to suppress buckling of the sheet even when a load to be applied from the paddle to the sheet is increased.

In a liquid ejecting apparatus of a ninth aspect according to any one of the first to eighth aspects, the heating unit is configured to move in a width direction orthogonal to the direction of transportation, and the control unit controls movement in the width direction of the heating unit in conformity to a location where the dried region is formed on the sheet.

According to this aspect, it is possible to change the region on the sheet to be formed into the dried region by moving the heating unit in the width direction, and thus to deal with a case where the region intended to be enhanced in rigidity on the sheet is altered due to a change in material of the sheet and the like.

In a liquid ejecting apparatus of a tenth aspect according to any one of the first to ninth aspects, the control unit executes, based on control information inputted, any one of an operation to change a location of the dried region in the direction of transportation or a width direction orthogonal to the direction of transportation, and an operation to change whether or not to heat by the heating unit.

According to this aspect, it is possible to change the region to enhance the rigidity of the sheet in accordance with the control information.

In a liquid ejecting apparatus of an eleventh aspect according to the tenth aspect, the heating unit includes a heat roller configured to be attached to and detached from the sheet, and the control unit performs, based on the control information, control to switch between contact and noncontact of the heat roller with the sheet.

According to this aspect, the heat roller can start contact with the sheet not only from an end portion in the direction of transportation of the sheet but also from a portion in the direction of transportation of the sheet. Alternatively, the heat roller can be detached from a portion in the direction of transportation of the sheet. In this way, it is possible to freely set a location of the dried region in the direction of transportation of the sheet.

In a liquid ejecting apparatus of a twelfth aspect according to the eleventh aspect, the heating unit includes a roller that nips the sheet in conjunction with the heat roller, and the control unit changes the location of the dried region in the width direction by moving one of the heat roller and the roller in the width direction.

According to this aspect, a pressure is applied to the sheet by nipping the sheet by the heat roller and the roller. Thus, it is possible to enhance the rigidity of the dried region on the sheet as compared to a configuration in which heating alone is performed on the sheet.

In a liquid ejecting apparatus of a thirteenth aspect according to any one of the first to twelfth aspects, the liquid ejecting apparatus further includes: a shearing unit that performs a shearing process on the sheet, in which the control unit causes the dried region to be formed in a region on the sheet where the shearing process is carried out by the shearing unit, and causes the undried region to be formed in a region on the sheet where the shearing process is not carried out by the shearing unit.

According to this aspect, the dried region on the sheet is subjected to shearing. Since an amount of moisture of the liquid included in the dried region on the sheet is lower than that in the undried region, the rigidity against a force in a shearing direction is enhanced in the dried region. Thus, it is possible to suppress the occurrence of a shearing failure.

In a liquid ejecting apparatus of a fourteenth aspect according to any one of the first to thirteenth aspects, the transportation unit includes a rotor that transports the sheet downstream of the heating unit in the direction of transportation, and the rotor is located inside the dried region when the rotor is projected onto the sheet.

According to this aspect, the rotor comes into contact with the sheet on an inner side of the dried region when the sheet is transported. An amount of the liquid adhering to the dried region on the sheet is smaller than an amount of the liquid adhering to the undried region. Hence, it is possible to suppress transfer of the liquid from the sheet to the rotor.

In a liquid ejecting apparatus of a fifteenth aspect according to any one of the first to fourteenth aspects, the discharge unit includes a cursor configured to move in a width direction orthogonal to the direction of transportation, the cursor moves the sheet at the discharge unit in the width direction by being in contact with the sheet, and the control unit causes the dried region to be formed at a portion in the direction of transportation of the sheet from one end to another end in the width direction.

According to this aspect, the dried region is formed at a portion in the direction of transportation of the sheet from one end to the other end in the width direction. In this way, the rigidity of the sheet against a force that acts in the width direction is enhanced. Thus, it is possible to suppress buckling of the sheet when the cursor comes into contact with an end portions in the width direction of the sheet.

In a liquid ejecting apparatus of a sixteenth aspect according to any one of the first to fifteenth aspects, the liquid ejecting apparatus further includes: a temperature measurement unit that measures a temperature inside the apparatus, in which the control unit does not operate the heating unit when the temperature measured by the temperature measurement unit is higher than a temperature threshold.

According to this aspect, when the temperature inside the apparatus is higher than the temperature threshold, the drying of the sheet is promoted without using the heating unit. Thus, it is possible to suppress energy consumption in the liquid ejecting apparatus by suspending the operation of the heating unit when the temperature of the sheet is higher than the temperature threshold.

In a liquid ejecting apparatus of a seventeenth aspect according to any one of the first to sixteenth aspects, the liquid ejecting apparatus further includes: a humidity measurement unit that measures a humidity inside the apparatus, in which the control unit does not operate the heating unit when the humidity measured by the humidity measurement unit is lower than a humidity threshold.

According to this aspect, when the humidity inside the apparatus is lower than the humidity threshold, the drying of the sheet is promoted without using the heating unit. Thus, it is possible to suppress energy consumption in the liquid ejecting apparatus by suspending the operation of the heating unit when the humidity of the sheet is lower than the humidity threshold.

In a liquid ejecting apparatus of a eighteenth aspect according to any one of the first to seventeenth aspects, the discharge unit includes a recess and a protrusion which are arranged in a width direction orthogonal to the direction of transportation, the protrusion is opposed to the dried region on the sheet, and the recess is opposed to the undried region on the sheet.

The undried region is formed on the sheet discharged to the discharge unit. Thus, the liquid on the sheet may adhere to the discharge unit.

Here, according to this aspect, the discharge unit is provided with the recess and the protrusion. This reduces a contact area between the discharge unit and the sheet.

Moreover, the protrusion that is more likely to come into contact with the sheet as compared to the recess is opposed to the dried region on the sheet. Hence, it is possible to suppress adhesion of the liquid to the discharge unit.

A method according to a nineteenth aspect is a method for controlling a liquid ejecting apparatus including a transportation unit that transports a sheet in a direction of transportation, an ejection unit that ejects a liquid to the sheet, a heating unit that heats the sheet to which the liquid is ejected, a discharge unit to which the heated sheet is discharged, and a control unit that controls, based on information inputted, the transportation unit, the ejection unit, and the heating unit, the method including: specifying an amount of ejection of the liquid from the ejection unit; ejecting the liquid from the ejection unit to the sheet; controlling an operation to heat the sheet by the heating unit such that an undried region where the liquid on the sheet is not dried and a dried region where the liquid on the sheet is dried as compared to the liquid in the undried region are formed on the sheet; and controlling a transporting operation by the transportation unit such that the sheet on which the dried region and the undried region are formed is discharged to the discharge unit.

According to this aspect, it is possible to obtain the same operation and effects as those of the liquid ejecting apparatus of the first aspect.

A non-transitory computer-readable storage medium storing a program according to a twentieth aspect is a non-transitory computer-readable storage medium storing a program for controlling a liquid ejecting apparatus including a transportation unit that transports a sheet in a direction of transportation, an ejection unit that ejects a liquid to the sheet, a heating unit that heats the sheet to which the liquid is ejected, a discharge unit to which the heated sheet is discharged, and a control unit that controls, based on information inputted, the transportation unit, the ejection unit, and the heating unit, the program causing a computer to execute a process including: specifying an amount of ejection of the liquid from the ejection unit; ejecting the liquid from the ejection unit to the sheet; controlling an operation to heat the sheet by the heating unit such that an undried region where the liquid on the sheet is not dried and a dried region where the liquid on the sheet is dried as compared to the liquid in the undried region are formed on the sheet; and controlling a transporting operation by the transportation unit such that the sheet on which the dried region and the undried region are formed is discharged to the discharge unit.

According to this aspect, it is possible to obtain the same operation and effects as those of the liquid ejecting apparatus of the first aspect.

Embodiments each representing an example of a liquid ejecting apparatus, a method for controlling a liquid ejecting apparatus, and a non-transitory computer-readable storage medium storing a program for controlling a liquid ejecting apparatus according to the present disclosure will be specifically described below.

Embodiment 1

FIG. 1 illustrates a recording system 1 representing an example of a liquid ejecting apparatus. The recording system 1 is formed as an apparatus of an ink jet type that performs recording by ejecting an ink Q as an example of a liquid to a paper sheet P as an example of a sheet.

In the x-y-z coordinate system illustrated in the respective drawings, the x direction represents a width direction of the apparatus, the y direction represents a depth direction of the apparatus, and the z direction represents a height direction of the apparatus. The x direction, the y direction, and the z direction are orthogonal to one another. The y direction represents an example of a width direction of the paper sheet P.

When a left side and a right side relative to the center in the width direction of the apparatus need to be distinguished in front view of the recording system 1, the left side will be defined as +x direction and the right side will be defined as −x direction. When a front side and a back side relative to the center in the depth direction of the apparatus need to be distinguished, the front side will be defined as +y direction and the back side will be defined as −y direction. When an upper side and a lower side relative to the center in the height direction of the apparatus need to be distinguished, the upper side will be defined as +z direction and the lower side will be defined as −z direction.

The recording system 1 includes a recording unit 2, an intermediate unit 4, and a post-process unit 30 arranged in this order in the +x direction. In the recording system 1, the recording unit 2, the intermediate unit 4, and the post-process unit 30 are coupled mechanically and electrically to one another. The intermediate unit 4 transports the paper sheet P fed in from the recording unit 2 to the post-process unit 30.

Here, the recording system 1 is configured to perform post-processing to be described later on the paper sheet P on which information is recorded by an image forming unit 10 to be described later.

A route on which the paper sheet P is transported in the recording system 1 will be referred to as a transportation route K.

The recording system 1 may further include an operating unit 15 (FIG. 2) to be operated by a user, and a display unit 17 (FIG. 2) to display a variety of information about the recording system 1. In this embodiment, the recording unit 2 is provided with the operating unit 15 and the display unit 17, for example.

For example, the operating unit 15 and the display unit 17 are formed from a single touch panel, and is configured to be capable of executing operations of the respective constituents of the recording system 1 and of setting a variety of information. The variety of information includes a size of the paper sheet P.

A direction of transportation of the paper sheet P is indicated by an arrow T. In the following description, the direction of transportation of the paper sheet P will be simply referred to as the direction of transportation. Note that the direction of transportation is not constant and its angle relative to a horizontal direction changes depending on the location of the paper sheet P in the transportation route K.

The recording unit 2 records a variety of information on the paper sheet P being transported. The paper sheet P is formed into a sheet shape. The recording unit 2 may include the image forming unit 10, a scanner unit 12, a cassette container unit 14, a power supply 16, and a transportation unit 19.

The image forming unit 10 may include a recording head 20 and a control unit 24, for example.

The scanner unit 12 reads information on an original (not illustrated).

The cassette container unit 14 includes container cassettes 18 that contain multiple paper sheets P.

The recording head 20 is formed as a line head, for example. The recording head 20 includes an ejection unit 22 formed from nozzles (not illustrated).

The ejection unit 22 performs recording by ejecting the ink Q onto the paper sheet P transported.

Figure 2:
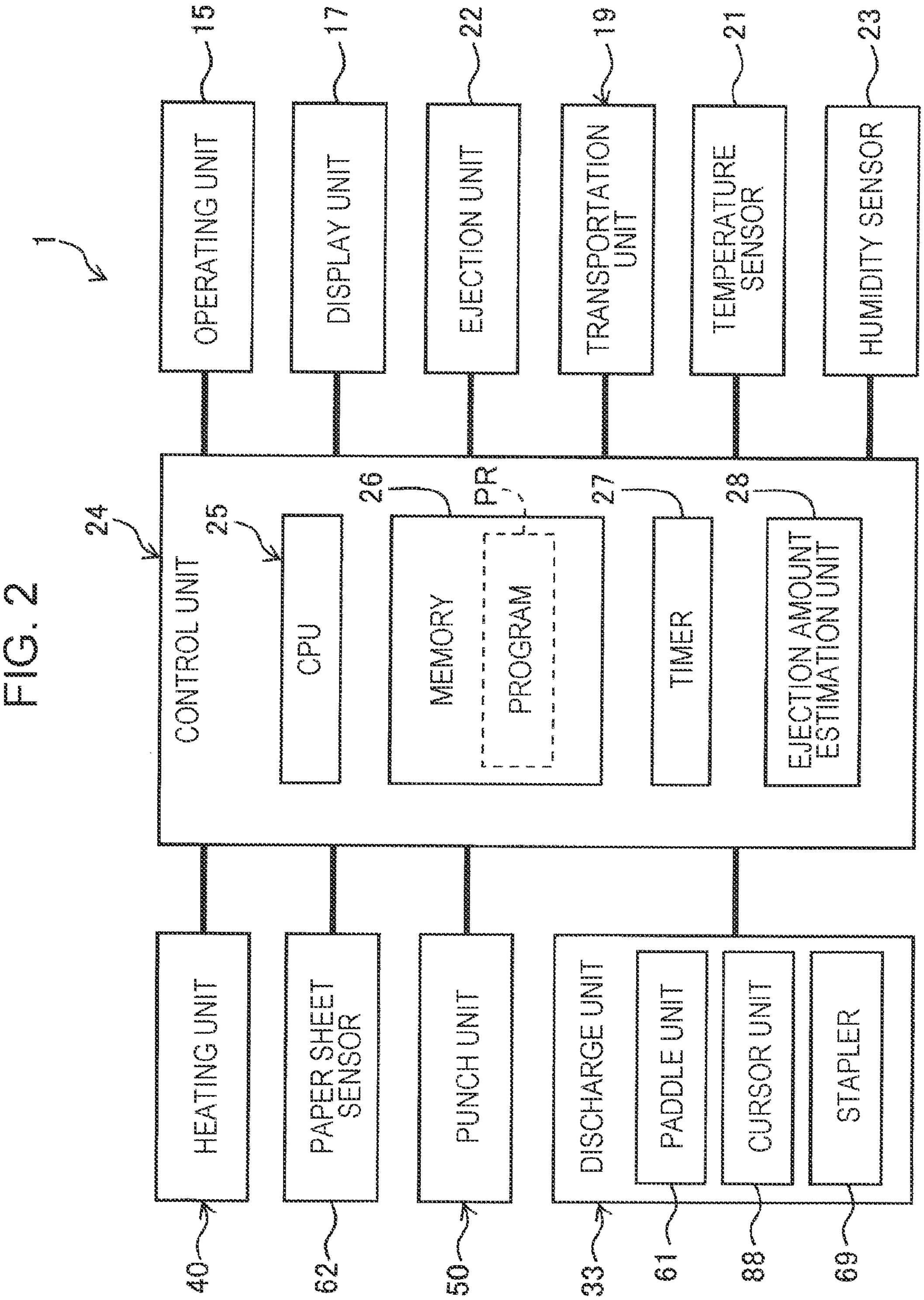
FIG. 2 is a block diagram of a principal part of the recording system of Embodiment 1.

As illustrated in FIG. 2, the control unit 24 functioning as a computer includes a central processing unit (CPU) 25, a memory 26, a timer 27 that is capable of measuring an amount of time or time of the day based on each point of time, an ejection amount estimation unit 28, and a storage (not illustrated). The control unit 24 controls various operations of the respective constituents of the recording system 1.

The control unit 24 controls the transportation unit 19, the ejection unit 22 as well as a punch unit 50 and a heating unit 40 to be described later based on information inputted to the control unit 24. The control unit 24 controls ejection of the ink Q from the ejection unit 22 based on image data.

The memory 26 represents an example of a storage unit which stores various data. The various data including a program PR to be executed by the CPU 25 are stored in the memory 26. In other words, the memory 26 represents an example of a storage medium in which the computer-readable program PR is stored. Other examples of the storage medium include a compact disc (CD), a digital versatile disc (DVD), a Blu-ray disc, a Universal Serial Bus (USB) memory, and the like. The program PR can be developed in part of the memory 26.

The program PR is a program for causing the CPU 25 to execute respective steps in the recording system 1 to be described later.

The ejection amount estimation unit 28 estimates an amount of ejection of the ink Q from the ejection unit 22. Specifically, the ejection amount estimation unit 28 estimates a maximum value of the amount of ejection of the ink Q from the ejection unit 22 by applying recording density information representing the number of pixels per unit area of the paper sheet P to a table (not illustrated) representing a relation between a recording density stored in advance and the amount of ejection of the ink Q. In other words, the control unit 24 specifies the amount of ejection of the ink Q from the ejection unit 22. In the following description, the amount of ejection of the ink Q estimated by the ejection amount estimation unit 28 will be referred to as an amount of ejection V. The amount of ejection V is not limited only to the maximum value of the amount of ejection of the ink Q, but is the amount estimated by the ejection amount estimation unit 28.

The recording system 1 is provided with a temperature sensor 21 and a humidity sensor 23.

The temperature sensor 21 is an example of a temperature measurement unit which measures a temperature inside the apparatus of the recording system 1. In this embodiment, the temperature sensor 21 is provided inside the recording unit 2. Temperature information obtained by the temperature sensor 21 is transmitted to the control unit 24.

The humidity sensor 23 is an example of a humidity measurement unit which measures a humidity inside the apparatus of the recording system 1. In this embodiment, the humidity sensor 23 is provided inside the recording unit 2. Humidity information obtained by the humidity sensor 23 is transmitted to the control unit 24.

As illustrated in FIG. 1, the transportation unit 19 is provided across the entire recording system 1. The transportation unit 19 includes pairs of rollers and motors which are not illustrated in FIG. 1, and is configured to transport the paper sheet P in the direction of transportation. To be more precise, the transportation unit 19 transports the paper sheet P from one of the container cassettes 18 to a recording zone of the recording head 20, and further transports the paper sheet P from the recording zone to the post-process unit 30 via the intermediate unit 4. The operation to transport the paper sheet P by the transportation unit 19 is controlled by the control unit 24.

The post-process unit 30 includes a housing 32, a discharge unit 33, the heating unit 40, the punch unit 50, a paper sheet sensor 62 (FIG. 2), and transportation roller pairs 65 and 66. The transportation route K on which the paper sheet P is transported by the transportation unit 19 is formed inside the housing 32. The paper sheet P received from the intermediate unit 4 is transported along the transportation route K, and is discharged to the discharge unit 33.

For example, the punch unit 50 is provided at a lower part in the −z direction relative to the center in the z direction of the housing 32. Here, a region constituting part of the transportation route K and being opposed to the punch unit 50 extends along the x direction, for example. In this way, a region on the paper sheet P to be subjected to a shearing process is arranged almost along the horizontal direction.

The paper sheet sensor 62 (FIG. 2) is provided upstream of the punch unit 50 in the direction of transportation. For example, the paper sheet sensor 62 includes a light-emitting portion (not illustrated) and a light-receiving portion (not illustrated). Hence, the paper sheet sensor 62 detects a point of time of passage of the paper sheet P through the paper sheet sensor 62 and a position of the paper sheet P on the transportation route K by determining whether or not light from the light-emitting portion is received by the light-receiving portion.

As illustrated in FIG. 2, the discharge unit 33 includes a discharged paper sheet tray 34 (FIG. 5), a paddle unit 61, a cursor unit 88, a stapler 69, and an alignment plate 106 (FIG. 1). The discharge unit 33 is a region where the paper sheet P heated by the heating unit 40 to be described later is discharged. The paper sheet P thus discharged is placed on the discharged paper sheet tray 34.

Figure 5:
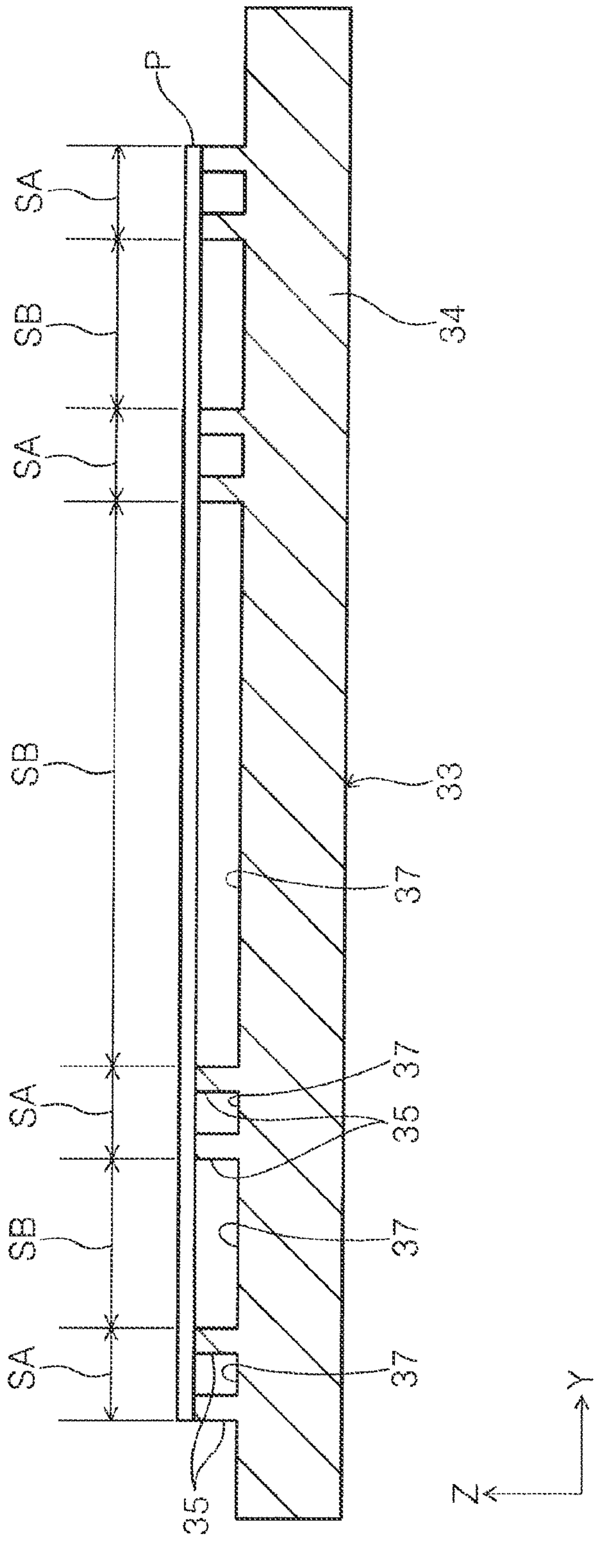
FIG. 5 is a longitudinal sectional view illustrating a discharge unit of the recording system of Embodiment 1.

As illustrated in FIG. 5, recesses 37 and protrusions 35, which are arranged in the y direction orthogonal to the direction of transportation, are formed in the discharged paper sheet tray 34. In other words, the discharge unit 33 is provided with the recesses 37 and the protrusions 35.

Each protrusion 35 is a rib-like region that protrudes in the +z direction from an end portion in the +z direction of the discharged paper sheet tray 34 and extends in the direction of transportation. Moreover, the protrusion 35 is opposed in the z direction to and is in contact with a dried region SA on the paper sheet P to be described later. In this embodiment, two protrusions 35 are in contact with each dried region SA, for example.

Each recess 37 is located between the protrusions that are adjacent to each other in the y direction. Moreover, each recess 37 is opposed in the z direction to an undried region SB on the paper sheet P to be described later with an interval in between.

As illustrated in FIGS. 1 and 2, the alignment plate 106 stands upright from an end portion in the −x direction of the discharged paper sheet tray 34. The alignment plate 106 aligns end portions of the paper sheets P.

The paddle unit 61 presses the discharged paper sheets P against the alignment plate 106.

The cursor unit 88 aligns end portions in the y direction of the paper sheets P when the paper sheets P are stacked on the discharged paper sheet tray 34.

The stapler 69 forms a bundle of paper sheets by driving in a staple (not illustrated) in the paper sheets P stacked on the discharged paper sheet tray 34.

Figure 3:
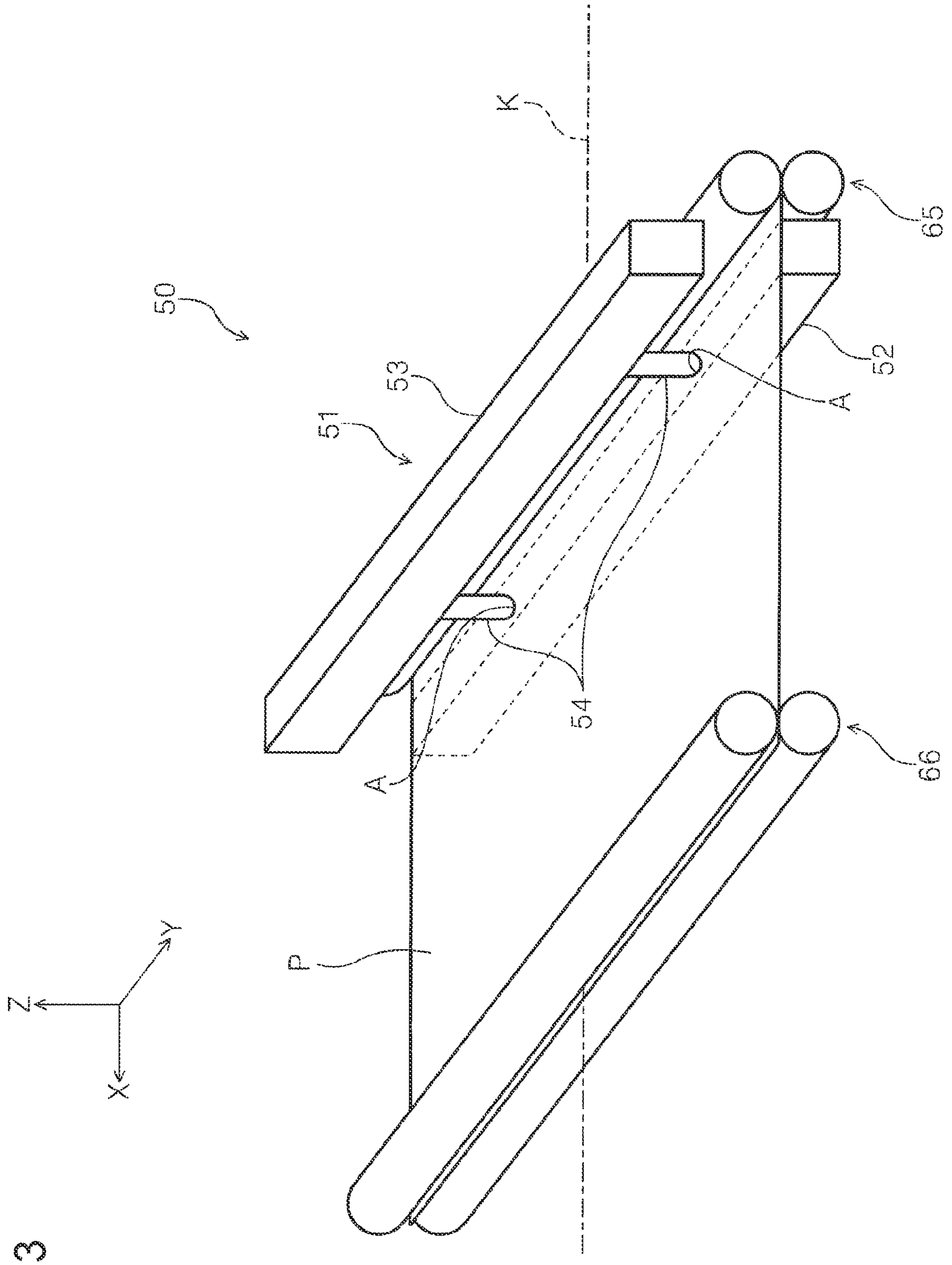
FIG. 3 is a perspective view illustrating a punch unit of the recording system of Embodiment 1.

As illustrated in FIG. 3, the punch unit 50 represents an example of a shearing unit that performs a shearing process. The punch unit 50 includes a unit body 51, a die 52 serving as a seat portion, and a driving unit (not illustrated). As an example of the shearing process, the punch unit 50 forms through holes A at two positions in the y direction of each paper sheet P.

The unit body 51 includes punching members 54, and a support portion 53 that supports the punching members 54.

Each punching member 54 is formed into a cylindrical shape with its central axis extending in the z direction. A blade portion (not illustrated) is formed at an end portion in the −z direction of the punching member 54. Moreover, two punching members 54 are provided at an interval in the y direction, for example.

The driving unit (not illustrated) includes a motor and a cam, and drives the two punching members 54 in one of the −z direction and the +z direction.

When the punching members 54 are driven in the −z direction by the driving unit (not illustrated), the punching members 54 form the through holes A by applying a shearing force in the −z direction to the paper sheet P to which the ink Q is ejected.

The transportation roller pair 65 is provided upstream of the punch unit 50 in the direction of transportation. The transportation roller pair 66 is provided downstream of the punch unit 50 in the direction of transportation. The transportation roller pairs 65 and 66 are rotated so as to transport the paper sheet P downstream in the direction of transportation.

Note that processing with the punch unit 50 is not carried out in Embodiment 1.

Figure 4:
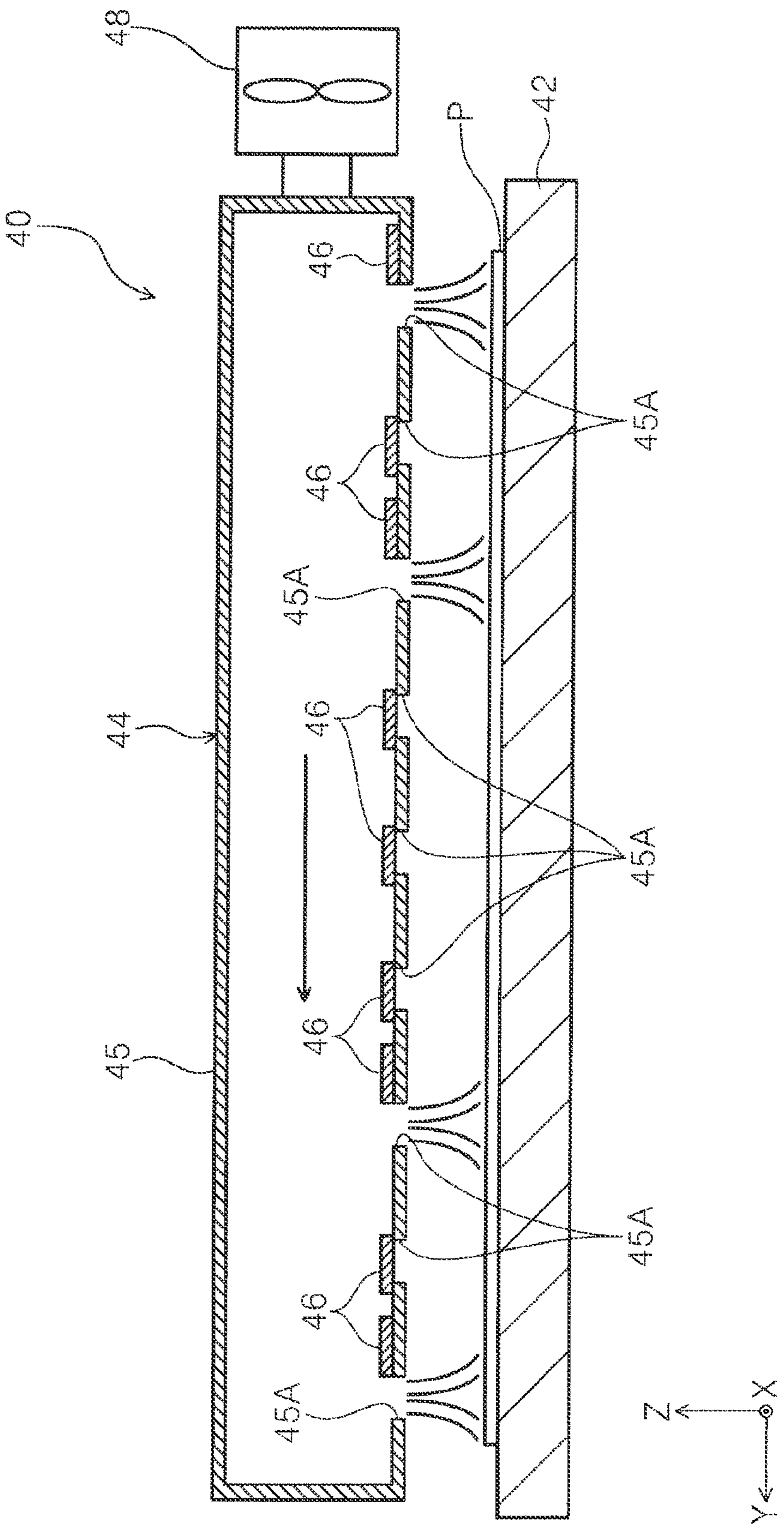
FIG. 4 is a longitudinal sectional view illustrating a heating unit of the recording system of Embodiment 1.

As illustrated in FIG. 4, the heating unit 40 heats and dries a portion of the paper sheet P to which the ink Q is ejected, for example. The heating unit 40 includes a support plate 42 that supports the paper sheet P, a duct unit 44 that is opposed to the support plate 42 or the paper sheet P in the z direction, and a fan heater 48 that sends heated air into the duct unit 44, for example.

The duct unit 44 includes a duct body 45 and shutter members 46.

The duct body 45 is formed into a prism shape that extends in the y direction. A length in the y direction of the duct body 45 is larger than a length in the y direction of the paper sheet P. Flow out ports 45A are formed in a region of the duct body 45 opposed to the paper sheet P.

The flow out ports 45A are arranged at intervals in the y direction. Each of the flow out ports 45A is made openable/closable by using the shutter members 46 provided one by one thereto. Opening/closing operations of the shutter members 46 are carried out by controlling motors (not illustrated) by the control unit 24 (FIG. 2).

As described above, the heating unit 40 is configured to blow the heated air, which is sent from the fan heater 48 into the duct body 45, from the flow out ports 45A in an open state to the paper sheet P. In this embodiment, four locations in total, namely, two end portions and two central portions in the y direction of the paper sheet P are heated by the blown air, for example.

Figure 6:
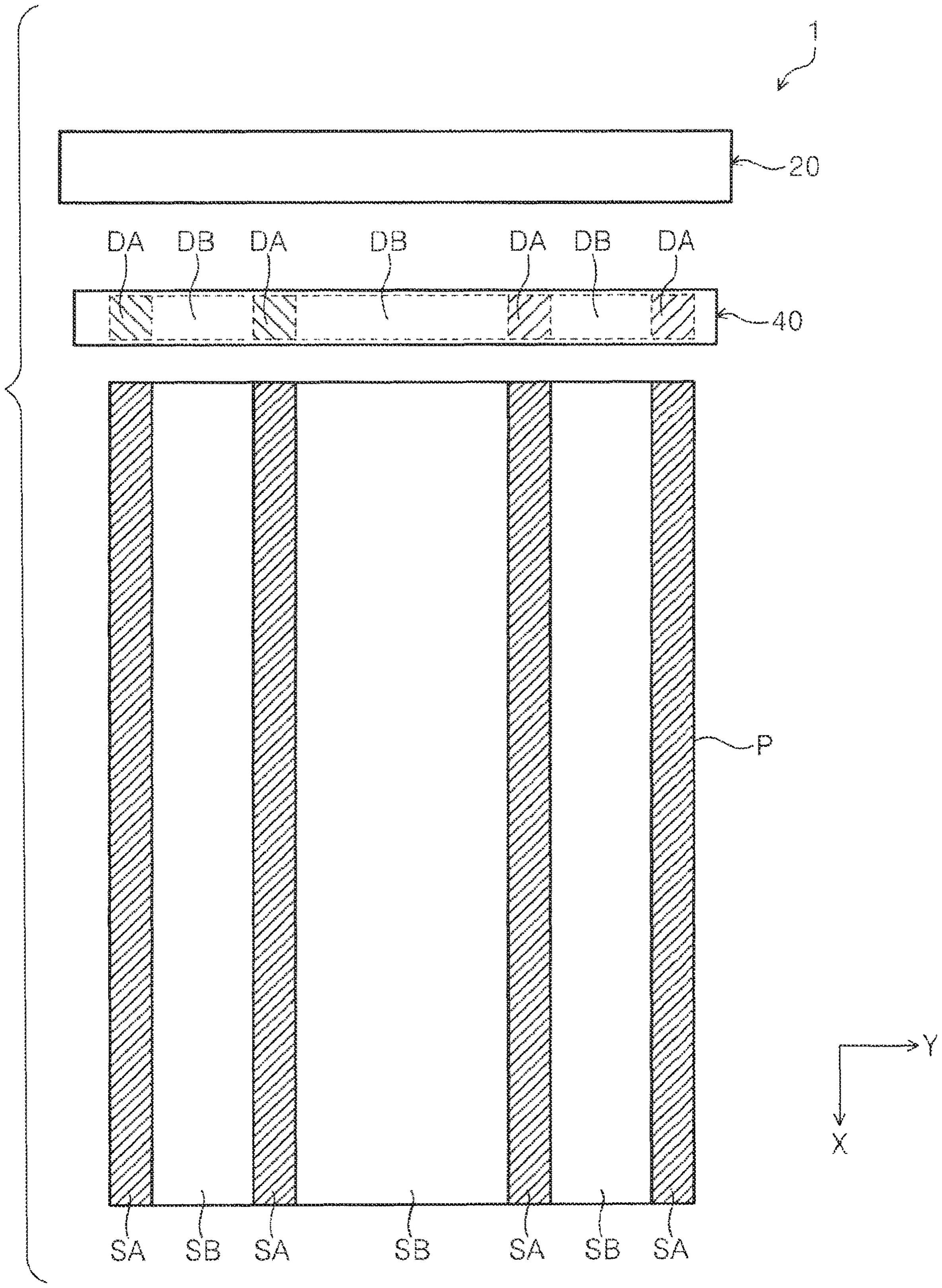
FIG. 6 is a plan view illustrating a recording head, the heating unit, and a paper sheet of the recording system of Embodiment 1.

As illustrated in FIG. 6, each region on the paper sheet P where the ink Q is not heated by the heating unit 40 will be referred to as the undried region SB.

On the other hand, each region on the paper sheet P where the ink Q on the paper sheet P is dried as compared to the undried region SB by the heating by the heating unit 40 will be referred to as the dried region SA. Note that the term drying in this specification means reduction in moisture contained in the ink Q relative to a case of not carrying out any treatment.

Each dried region SA is formed into a rectangular shape in which a dimension in the X direction is larger than a dimension in the Y direction when viewed in the z direction. The dried regions SA are formed at four locations at intervals in the y direction. The undried regions SB are formed at three locations each between an adjacent pair out of the four dried regions SA. In this way, the dried regions SA and the undried regions SB are arranged in the y direction.

For example, the heating unit 40 can change heating quantities in two stages. Regarding heating quantities DA and DB on the paper sheet P in the heating unit 40 per unit time, the heating quantity DA is larger than the heating quantity DB.

The control by the control unit 24 of Embodiment 1 will be summarized.

The control unit 24 specifies the amount of ejection V of the ink Q from the ejection unit 22 in accordance with the above-described method. Moreover, the control unit 24 controls an operation of the heating unit 40 such that the undried regions SB and the dried regions SA are formed on the paper sheet P. Furthermore, the control unit 24 controls a transporting operation by the transportation unit 19 such that the paper sheet P on which the dried regions SA and the undried regions SB are formed is discharged to the discharge unit 33.

The control unit 24 changes the heating quantity from the heating unit 40 depending on the amount of ejection of the ink Q from the ejection unit 22.

When a value of a temperature measured with the temperature sensor 21 is higher than a preset threshold, the control unit 24 does not operate the heating unit 40 because a state of a high temperature is likely to promote natural drying of the ink Q on the paper sheet P.

Moreover, when a value of a humidity measured with the humidity sensor 23 is lower than a preset threshold, the control unit 24 does not operate the heating unit 40 because a state of a low humidity is likely to promote natural drying of the ink Q on the paper sheet P.

Next, an operation of the recording system 1 of Embodiment 1 will be described.

Figure 7:
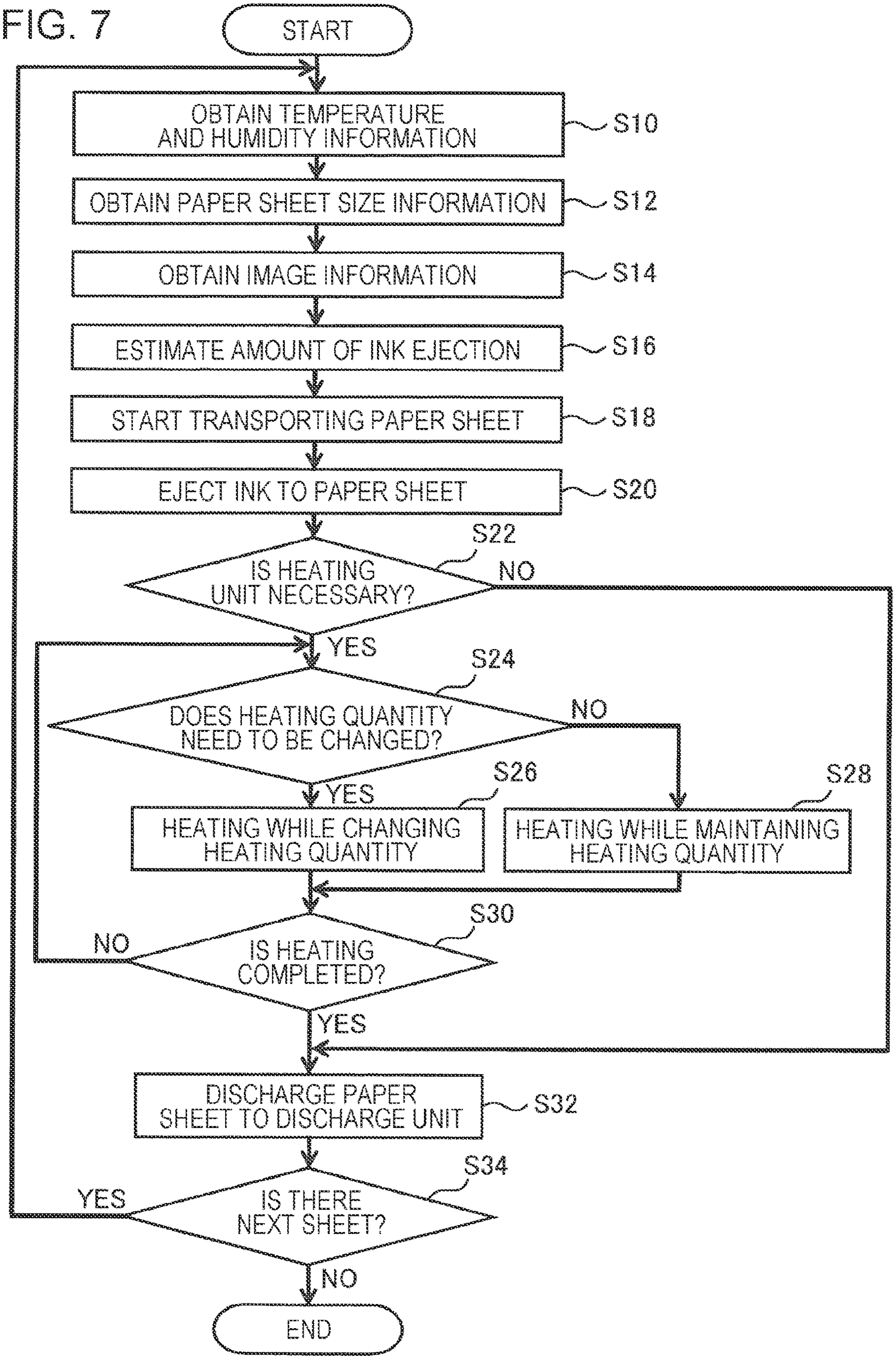
FIG. 7 is a flowchart illustrating a flow of respective procedures to be executed by the recording system of Embodiment 1.

FIG. 7 is a flowchart illustrating a flow of respective procedures when the heating of the paper sheet P is selected depending on the amount of ejection of the ink Q to the paper sheet P. Note that the respective units constituting the recording system 1 are supposed to be referred to FIGS. 1 to 6 and the description of the individual reference signs will be omitted. The respective procedures illustrated in FIG. 7 are carried out by causing the CPU 25 to read, develop, and execute the program PR from the memory 26.

In step S10, the CPU 25 obtains the temperature information from the temperature sensor 21 and obtains the humidity information from the humidity sensor 23. Then, the CPU 25 proceeds to step S12.

In step S12, the CPU 25 obtains size information on the paper sheet P. Then, the CPU 25 proceeds to step S14.

In step S14, the CPU 25 obtains image information. Then, the CPU 25 proceeds to step S16.

In step S16, the CPU 25 causes the ejection amount estimation unit 28 to estimate the amount of ejection V. In other words, the control unit 24 specifies the amount of ejection V. Then, the CPU 25 proceeds to step S18.

In step S18, the CPU 25 starts transporting the paper sheet P. Then, the CPU 25 proceeds to step S20.

In step S20, the CPU 25 drives the ejection unit 22, thereby causing the ejection unit 22 to eject the ink Q to the paper sheet P so as to obtain the amount of ejection V. Then, the CPU 25 proceeds to step S22.

In step S22, the CPU 25 determines whether or not the heating unit 40 is necessary based on the amount of ejection V, the temperature information, and the humidity information obtained. In other words, the CPU 25 determines whether or not the paper sheet P needs to be heated by comparing the respective values of the amount of ejection V, the temperature, and the humidity obtained with preset first thresholds. When the heating unit 40 is necessary (S22: YES), the CPU 25 proceeds to step S24. When the heating unit 40 is not necessary (S22: NO), the CPU 25 proceeds to step S32.

Here, regarding a portion of the heating unit 40 that extends out of the paper sheet P due to the small size of the paper sheet P, the shutter member 46 corresponding to that portion is set to a closed state in advance.

In step S24, the CPU 25 determines whether or not the heating quantity needs to be changed from a preset reference heating quantity depending on the amount of ejection V obtained in step S16. When the heating quantity is to be changed (S24: YES), the CPU 25 proceeds to step S26. When the heating quantity is to be unchanged (S24: NO), the CPU 25 proceeds to step S28.

In step S26, the CPU 25 heats the paper sheet P by operating the heating unit 40. Specifically, when the value of the amount of ejection V is larger than the above-mentioned first threshold and is smaller than a second threshold, the heating quantity is reduced relative to the reference heating quantity. The heating quantity is increased when the value of the amount of ejection V is larger than the second threshold. Then, the CPU 25 proceeds to step S30.

In step S28, the CPU 25 heats the paper sheet P by operating the heating unit 40 so as to bring the heating quantity equal to the reference heating quantity. Here, step S28 corresponds to a case where the value of the amount of ejection V is equal to the second threshold. Then, the CPU 25 proceeds to step S30.

Note that each of step S26 and step S28 is a step of controlling the operation to heat the paper sheet P by the heating unit 40 so as to form the undried regions SB and the dried regions SA on the paper sheet P.

In step S30, the CPU 25 determines whether or not the heating of the paper sheet P is completed by judging whether or not the entire paper sheet P is passed through the heating unit 40 based on the output from the paper sheet sensor 62. When the heating of the paper sheet P is completed (S30: YES), the CPU 25 proceeds to step S32. When the heating of the paper sheet P is not completed (S30: NO), the CPU 25 proceeds to step S24.

In step S32, the CPU 25 discharges the paper sheet P to the discharge unit 33 by continuing the transportation of the paper sheet P by the transportation unit 19. Then, the CPU 25 proceeds to step S34.

In step S34, the CPU 25 determines whether or not there is the next paper sheet P to be processed based on information on the number of the paper sheets P to be processed which is set to the operating unit 15. When there is no next paper sheet P to be processed (S34: NO), the CPU 25 terminates the program PR. When there is the next paper sheet P to be processed (S34: YES), the CPU 25 proceeds to step S10.

In this way, when the paper sheet P is heated by the heating unit 40, the dried regions SA and the undried regions SB are formed on the paper sheet P.

As described above, according to the recording system 1, on the paper sheet P to which the ink Q is ejected, the regions not heated by the heating unit 40 are formed into the undried regions SB and the regions heated by the heating unit 40 are formed into the dried regions SA.

Here, formation of the dried regions SA on the paper sheet P enhances rigidity of the paper sheet P against the force in the direction of transportation as compared to the configuration in which the entire paper sheet P is formed into the undried region SB. Accordingly, it is possible to suppress partial buckling of the paper sheet P when the paper sheet P is discharged to the discharge unit 33. Moreover, since there are the unheated regions on the paper sheet P, it is possible to reduce energy consumption used for heating the paper sheet P as compared to the configuration in which the entire paper sheet P is heated by the heating unit 40. Here, the energy consumption may be translated to power consumption in this embodiment.

According to the recording system 1, the heating quantity from the heating unit 40 is changed depending on the amount of ejection V of the ink Q from the ejection unit 22. Thus, it is possible to form the dried regions SA appropriately while maintaining recording quality, and to appropriately improve the rigidity of the paper sheet P.

According to the recording system 1, it is possible to enhance the rigidity of the paper sheet P against the force in the direction of transportation.

According to the recording system 1, when the temperature inside the apparatus is higher than the temperature threshold, the drying of the paper sheet P is promoted by natural drying without using the heating unit 40. Thus, it is possible to suppress energy consumption in the recording system 1 by suspending the operation of the heating unit 40 when the temperature of the paper sheet P is higher than the temperature threshold.

According to the recording system 1, when the humidity inside the apparatus is lower than the humidity threshold, the drying of the paper sheet P is promoted by natural drying without using the heating unit 40. Thus, it is possible to suppress energy consumption in the recording system 1 by suspending the operation of the heating unit 40 when the humidity of the paper sheet P is lower than the humidity threshold.

The undried regions SB are formed on the paper sheet P discharged to the discharge unit 33. Thus, the ink Q on the paper sheet P may potentially adhere to the discharge unit 33.

Here, according to the recording system 1, the discharge unit 33 is provided with the recesses 37 and the protrusions 35, and the paper sheet P is in contact with the protrusions 35. This reduces a contact area between the discharge unit 33 and the paper sheet P. Moreover, the protrusions 35 which are more likely to be in contact with the paper sheet P as compared to the recesses 37 are opposed to the dried regions SA on the paper sheet P. Hence, it is possible to suppress adhesion of the ink Q to the discharge unit 33.

The same effects as those described above can also be obtained from a method for controlling the recording system 1 and a non-transitory computer-readable storage medium storing a program for the recording system 1.

Figure 8:
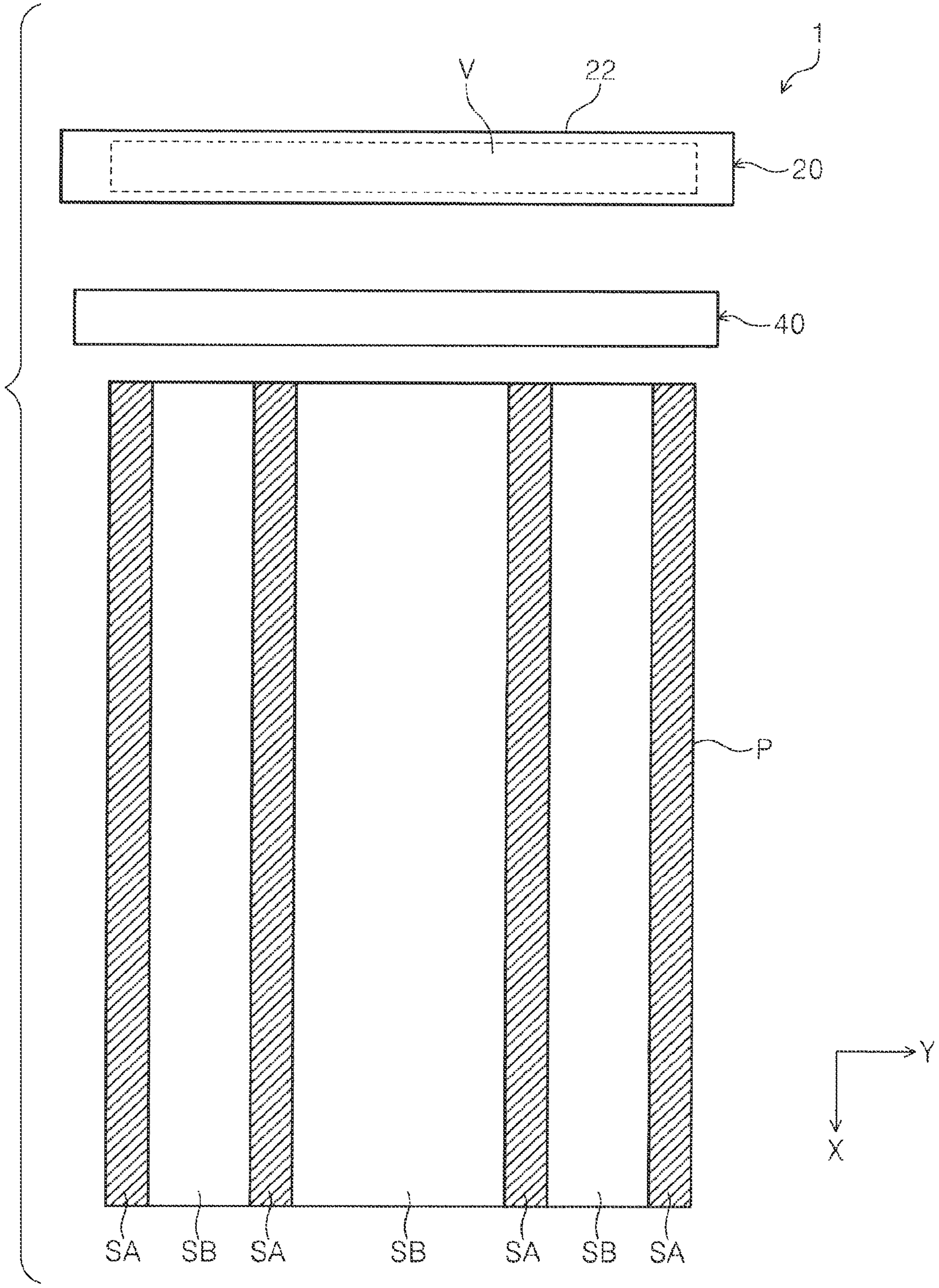
FIG. 8 is a plan view illustrating a recording head, a heating unit, and a paper sheet in a recording system of Modification 1 of Embodiment 1.

FIG. 8 illustrates the recording system 1 according to Modification 1 of Embodiment 1. The control unit 24 changes the amount of ejection V of the ink Q from the ejection unit 22 depending on a capacity of the heating unit

40. When the amount of the ink Q ejected from the ejection unit 22 is excessively large, it is not possible to form the appropriate dried regions SA on the paper sheet P because the amount of the ink Q is beyond the capacity of the heating unit 40. Thus, when the amount of ejection V is larger than a preset reference amount of ejection, printing duty as a recording density is generally and uniformly reduced. In other words, the amount of ejection V of the ink Q is reduced.

According to the recording system 1 of this modification of Embodiment 1, it is possible to prevent or reduce insufficient drying of the dried regions SA by the heating unit 40 in the case of the large amount of ejection V of the ink Q, thus improving the rigidity of the paper sheet P appropriately.

Figure 10A:
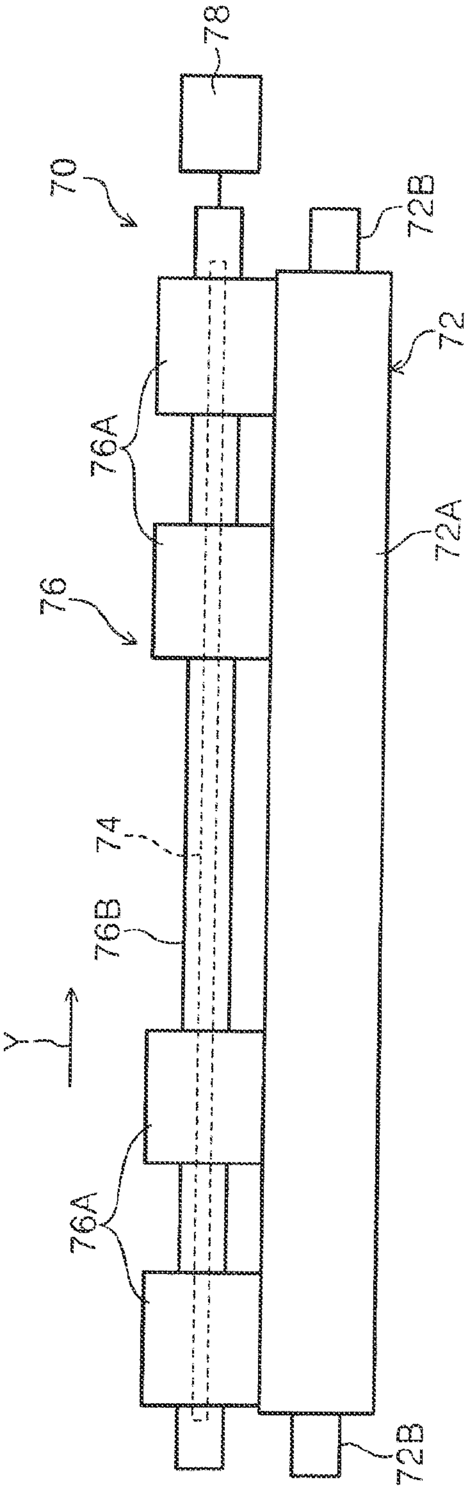
FIG. 10A is a front view illustrating a heating unit in a recording system of Modification 2 of Embodiment 1.

FIG. 10A illustrates a heating unit 70 in the recording system 1 according to Modification 2 of Embodiment 1.

The heating unit 70 heats and dries a portion in the y direction of the paper sheet P to which the ink Q is ejected. To be more precise, the heating unit 70 includes a transportation roller 72, a heat roller 76, a heater 74, and a movement mechanism unit 78. Electric power is supplied from the power supply 16 (FIG. 1) to the heating unit 70.

The transportation roller 72 includes a cylindrical shaft portion 72B and an enlarged diameter portion 72A having an enlarged diameter relative to the shaft portion 72B. The transportation roller 72 is rotatably provided around an axis (not illustrated) along the y direction. A length in the y direction of the enlarged diameter portion 72A is larger than the length in the y direction of the paper sheet P.

The heat roller 76 is driven by the movement mechanism unit 78 to be described later, thus being made attachable to and detachable from the paper sheet P and the transportation roller 72. The heat roller 76 includes a cylindrical shaft portion 76B and four enlarged diameter portions 76A each formed by enlarging a diameter at a part of the shaft portion 76B. The heat roller 76 is rotatably provided around an axis (not illustrated) along the y direction. Each length in the y direction of four enlarged diameter portion 76A is smaller than the length in the y direction of the paper sheet P. The four enlarged diameter portions 76A are disposed at intervals in the y direction. An outside diameter of the enlarged diameter portion 76A has substantially the same size as the outside diameter of the enlarged diameter portion 72A, for example.

The heater 74 is formed into a rod shape that extends in the y direction and is disposed inside the shaft portion 76B. The heater 74 generates heat by receiving power supplied from the power supply 16, thus heating the heat roller 76. As a consequence, the four enlarged diameter portions 76A are put into a heated state.

The heat roller 76 is rotated in a state where the four enlarged diameter portions 76A pinch the paper sheet P in conjunction with the transportation roller 72. Thus, the heat roller 76 transports the paper sheet P while heating regions at four locations in the y direction of the paper sheet P. In other words, the heating unit 70 heats the paper sheet P while applying a pressure thereto. Then, a heated part of the paper sheet P is put into a dried state as a consequence of evaporation of the moisture.

The movement mechanism unit 78 includes a motor and gears not illustrated in FIG. 10A. The movement mechanism unit 78 attaches and detaches the heat roller 76 to and from the paper sheet P and the transportation roller 72 by moving the shaft portion 76B.

In the recording system 1 of Modification 2, the control unit 24 executes any one of an operation to change the locations of the dried regions SA in the direction of transportation and an operation to change whether or not to heat by the heating unit 70 based on control information inputted. Moreover, the control unit 24 performs control to switch between contact and noncontact of the heat roller 76 with the paper sheet P based on the control information inputted.

For example, when the control information to cause the heating unit 70 to heat the paper sheet P is inputted, the control unit 24 causes the heat roller 76 to be in contact with the paper sheet P by controlling the drive of the movement mechanism unit 78. On the other hand, when the control information not to cause the heating unit 70 to heat the paper sheet P is inputted, the control unit 24 moves the heat roller 76 to a position away from the paper sheet P by controlling the drive of the movement mechanism unit 78.

According to the recording system 1 of Modification 2 that includes the heating unit 70, it is possible to change the region to enhance the rigidity of the paper sheet P in accordance with the control information. Moreover, according to the recording system 1 of Modification 2, the heat roller 76 can start contact with the paper sheet P not only from an end portion in the direction of transportation of the paper sheet P but also from a portion in the direction of transportation of the paper sheet P. Alternatively, the heat roller 76 can be detached from a portion in the direction of transportation of the paper sheet P. In this way, it is possible to freely set the locations of the dried regions SA in the direction of transportation of the paper sheet P.

Figure 10B:
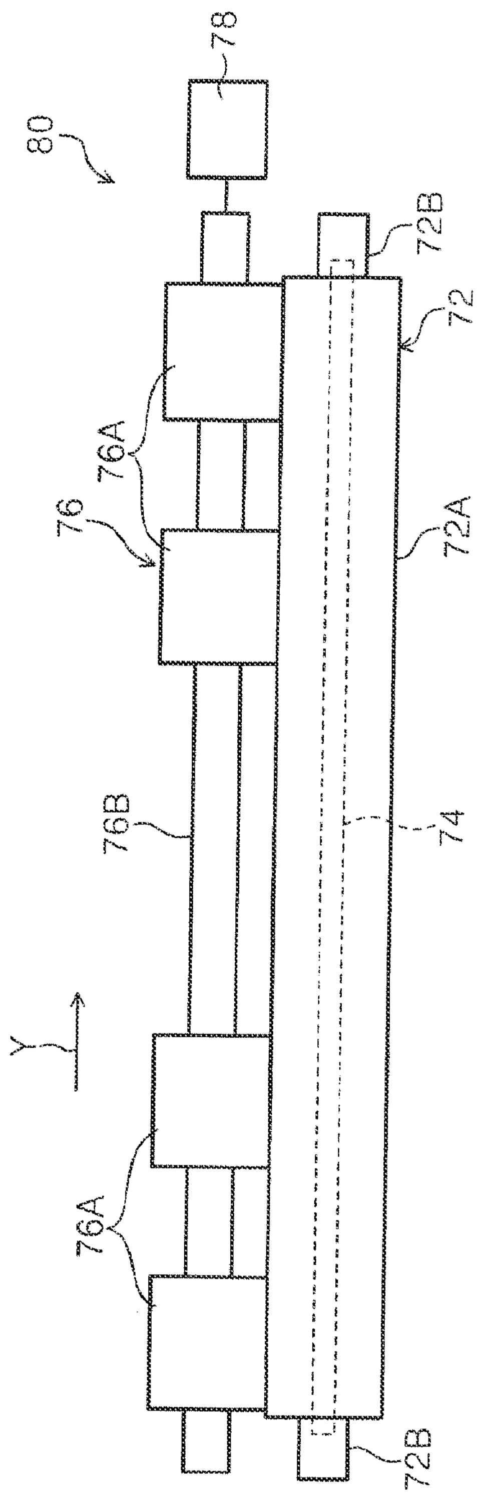
FIG. 10B is a front view illustrating a heating unit in a recording system of Modification 3 of Embodiment 1.

FIG. 10B illustrates a heating unit 80 in the recording system 1 according to Modification 3 of Embodiment 1.

The heating unit 80 has a configuration in which the heater 74 of the heating unit 70 (FIG. 10A) is disposed inside the shaft portion 72B instead of inside the shaft portion 76B. Thus, the heat roller 76 may be indirectly heated by heating the transportation roller 72 and causing the transportation roller 72 to be in contact with the heat roller 76.

Embodiment 2

Next, a recording system 1 according to Embodiment 2 will be described with reference to the accompanying drawings. Note that constituents of this embodiment which are the same as the constituents of the recording system 1 of Embodiment 1 will be denoted by the same reference signs and explanations thereof will be omitted.

The recording system 1 of Embodiment 2 is different in that the punch unit 50 of the recording system 1 of Embodiment 1 is put into use. The configuration except the use of the punch unit 50 is basically the same as the configuration of Embodiment 1.

Figure 9:
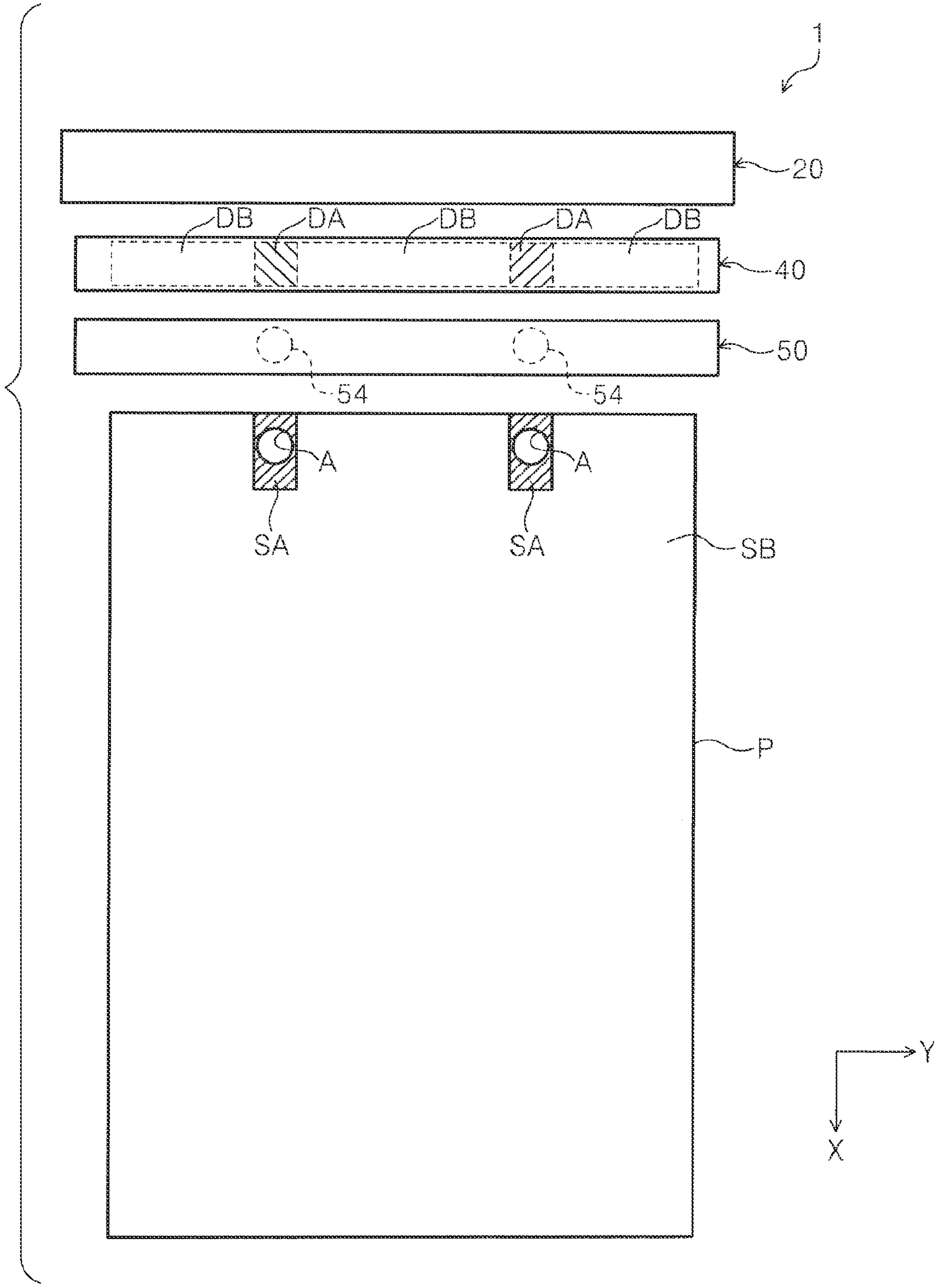
FIG. 9 is a plan view illustrating a recording head, a heating unit, a punch unit, and a paper sheet in a recording system of Embodiment 2.

As illustrated in FIG. 9, the punch unit 50 represents the example of the shearing unit that performs the shearing process on the paper sheet P.

In the heating unit 40, regions to apply the heating quantity DA are set in accordance with positions where the through holes A are formed in the paper sheet P.

Using the heating unit 40, the control unit 24 forms the dried regions SA in the regions on the paper sheet P where the shearing process is carried out by the punch unit 50, and forms the undried region SB in the region on the paper sheet P where the shearing process is not carried out by the punch unit 50.

Next, an operation of the recording system 1 of Embodiment 2 will be described.

According to the recording system 1 of Embodiment 2, each dried region SA on the paper sheet P is subjected to shearing. Since an amount of moisture of the ink Q included in the dried region SA on the paper sheet P is lower than that in the undried region SB thereof, the rigidity against a force in a shearing direction is enhanced in the dried region SA on the paper sheet P. Thus, it is possible to suppress the occurrence of shearing failures.

Embodiment 3

Next, a recording system 1 according to Embodiment 3 will be described with reference to the accompanying drawings. Note that constituents of this embodiment which are the same as the constituents of the recording system 1 of Modification 1 of Embodiment 1 will be denoted by the same reference signs and explanations thereof will be omitted.

The recording system 1 of Embodiment 3 is different from the recording system 1 according to Modification 1 of Embodiment 1 in that the recording system 1 of Embodiment 3 includes the heating unit 80 instead of the heating unit 40 (FIG. 1), and also includes a transportation roller 86 instead of the transportation roller pair 65 (FIG. 1). The configuration except the above is basically the same as the configuration of Modification 1 of Embodiment 1.

Figure 11:
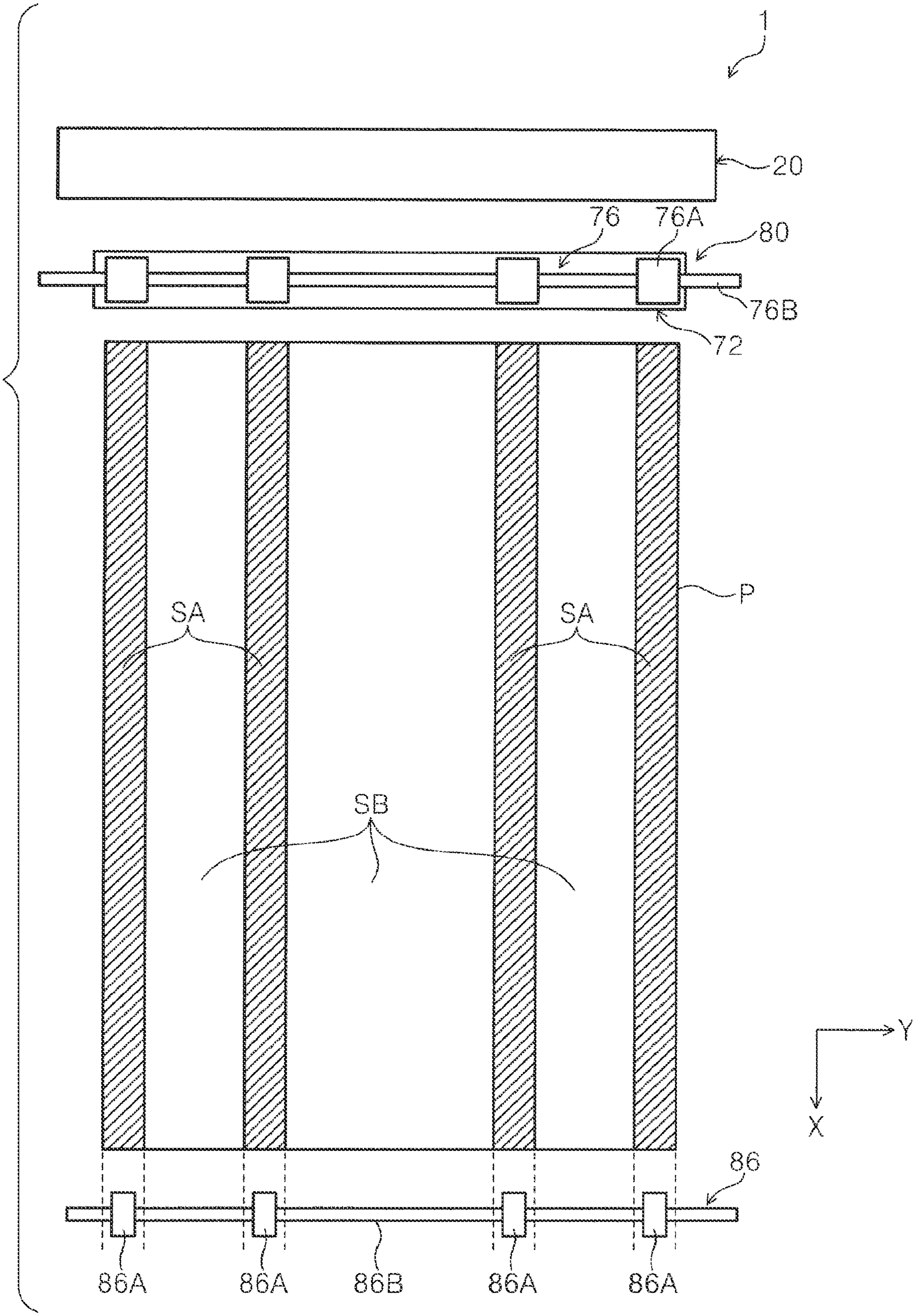
FIG. 11 is a plan view illustrating a recording head, a heating unit, a paper sheet, and a transportation roller in a recording system of Embodiment 3.

As illustrated in FIG. 11, the transportation roller 86 is provided downstream of the heating unit 80 in the direction of transportation. The transportation roller 86 includes a cylindrical shaft portion 86B and four enlarged diameter portions 86A each formed by enlarging a diameter in a radial direction from the shaft portion 86B, for example.

Each enlarged diameter portion 86A represents an example of a rotor. When the enlarged diameter portion 86A is projected onto the paper sheet P, the enlarged diameter portion 86A is located on an inner side of the corresponding dried region SA.

Next, an operation of the recording system 1 of Embodiment 3 will be described.

According to the recording system 1 of Embodiment 3, each enlarged diameter portion 86A comes into contact with the paper sheet P on an inner side of the dried region SA when the paper sheet P is transported. Here, the amount of the ink Q that may adhere to the dried region SA on the paper sheet P is smaller than the amount of the ink Q that may adhere to the undried region SB. Hence, it is possible to suppress the transfer of the ink Q from the paper sheet P to the enlarged diameter portion 86A.

Embodiment 4

Next, a recording system 1 according to Embodiment 4 will be described with reference to the accompanying drawings. Note that constituents of this embodiment which are the same as the constituents of the respective embodiments and the respective modifications described above will be denoted by the same reference signs and explanations thereof will be omitted.

The recording system 1 of Embodiment 4 includes the transportation unit 19 (FIG. 1), the ejection unit 22, a heating unit 82, the discharge unit 33, and the control unit (FIG. 2). The configuration except the above is basically the same as the configuration of Embodiment 1.

Figure 12:
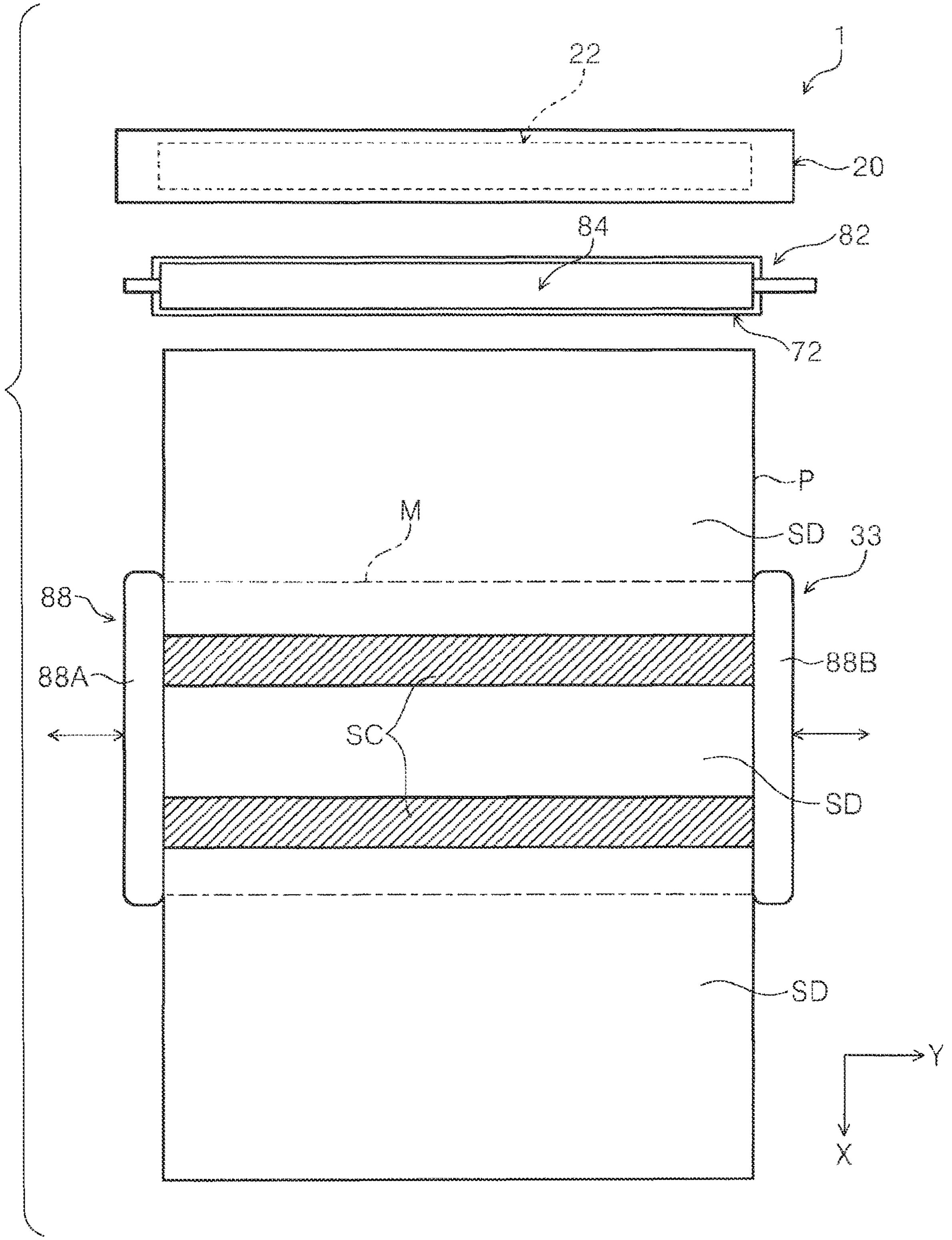
FIG. 12 is a plan view illustrating a recording head, a heating unit, a paper sheet, and cursors in a recording system of Embodiment 4.

FIG. 12 illustrates the recording head 20, the ejection unit 22, the heating unit 82, the discharge unit 33, and the paper sheet P.

When the amount of ejection V from the ejection unit 22 exceeds a set amount that is set in advance, the heating unit 82 heats a portion in the direction of transportation of the paper sheet P from one end to the other end in the y direction. In this embodiment, the heating unit 82 heats, for example, two locations in the direction of transportation of the paper sheet P.

A heat roller 84 is made attachable to and detachable from the paper sheet P by using a movement mechanism unit (not illustrated).

The discharge unit 33 is different in that the cursor unit 88 is provided to be movable in the y direction orthogonal to the direction of transportation.

The cursor unit 88 includes a cursor 88A that is located in the −y direction relative to the paper sheet P and a cursor 88B that is located in the +y direction relative to the paper sheet P.

The cursor 88A and the cursor 88B are made movable in directions to approach each other and to recede from each other by using a mechanism unit formed from a rack and a pinion that are not illustrated in FIG. 12. The cursor 88A and the cursor 88B come into contact with the paper sheets P in the discharge unit 33, thus moving the paper sheets P in the y direction and aligning positions of two end portions in the y direction of the paper sheets P.

The control unit 24 forms a dried region SC at a portion in the direction of transportation of the paper sheet P from one end to the other end in the y direction by using the heating unit 82. A region other than the dried region SC on the paper sheet P is an undried region SD. For example, dried regions SC are formed at two locations.

The two dried regions SC are located inside a region M on the paper sheet P sandwiched between the cursor 88A and the cursor 88B, for example.

Next, an operation of the recording system 1 of Embodiment 4 will be described.

According to the recording system 1 of Embodiment 4, the dried regions SC are formed at the portions in the direction of transportation of the paper sheet P from the one end to the other end in the y direction. This configuration enhances the rigidity of the paper sheet P against a force that acts in the y direction as compared to the paper sheet P entirely formed from the undried region SD. Thus, it is possible to suppress buckling of the paper sheet P when the cursors 88A and 88B are in contact with the end portions in the y direction of the paper sheet P.

Embodiment 5

Next, a recording system 1 according to Embodiment 5 will be described with reference to the accompanying drawings. Note that constituents of this embodiment which are the same as the constituents of the respective embodiments and the respective modifications described above will be denoted by the same reference signs and explanations thereof will be omitted.

The recording system 1 of Embodiment 5 is different from the recording system 1 according to Modification 3 of Embodiment 1 in that the recording system 1 of Embodiment 5 is provided with a heating unit 90 instead of the heating unit 80. The configuration except the above is basically the same as the configuration of Modification 3 of Embodiment 1.

Figure 13:
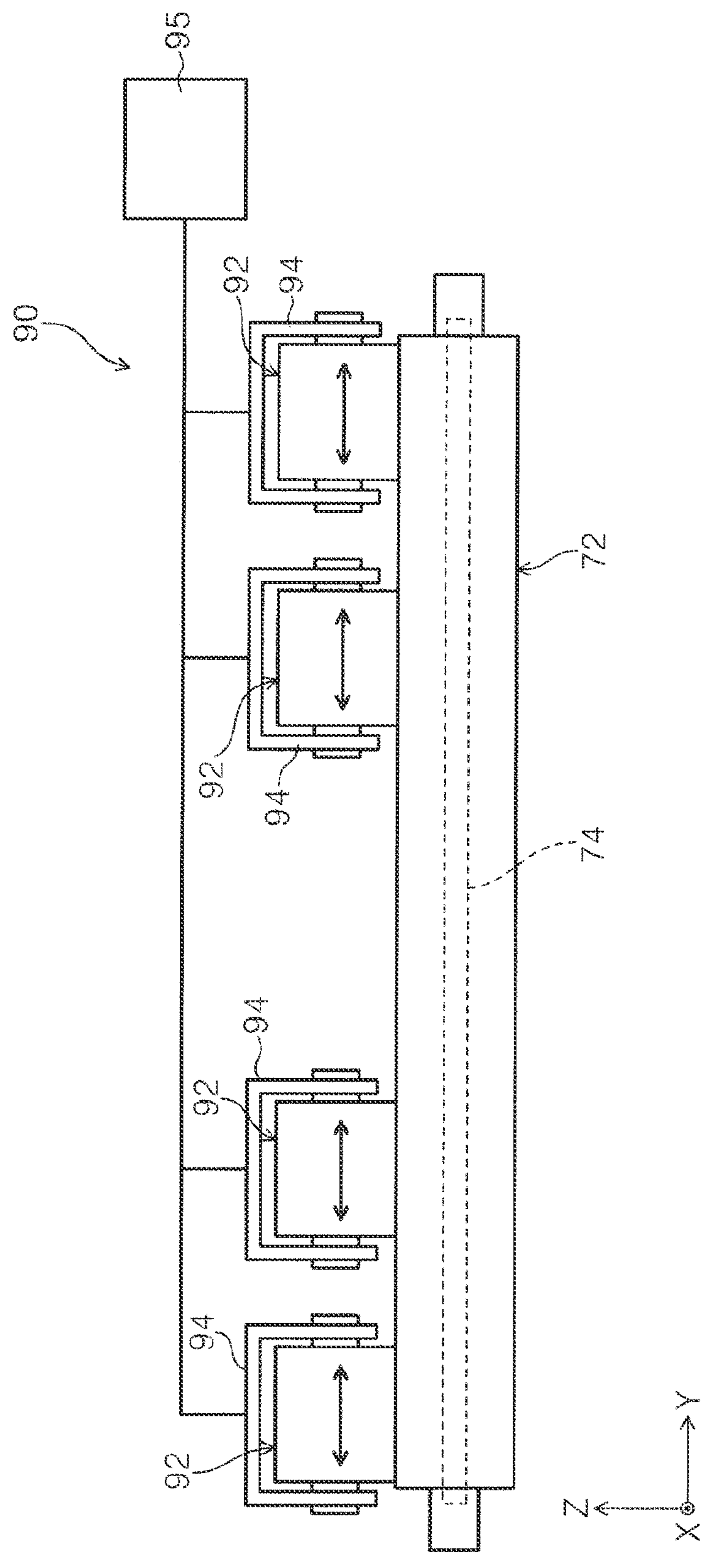
FIG. 13 is a front view illustrating a heating unit in a recording system of Embodiment 5.

FIG. 13 illustrates the heating unit 90.

For example, the heating unit 90 includes four heat rollers 92, four holders 94 that support the heat rollers 92 rotatably around the y axis, the transportation roller 72 as an example of a roller, the heater 74 as a heat source for heating the transportation roller 72, and a movement mechanism unit 95.

The heat rollers 92 are made capable of heating the paper sheet P by receiving the heat from the heater 74 through the transportation roller 72. In other words, the heat rollers 92 are heating rollers that perform indirect heating.

The transportation roller 72 nips the paper sheet P in conjunction with the heat rollers 92.

The movement mechanism unit 95 includes a linear slider 93 (FIG. 14), for example. The movement mechanism unit 95 is configured to collectively attach and detach the four heat rollers 92 to and from the paper sheet P and the transportation roller 72, for example.

The four sets of the heat rollers 92 and the holders 94 are fitted to the linear slider 93 such that a position in the y direction of each set of the heat roller 92 and the holder 94 can be changed independently in response to an instruction from the control unit 24.

The control unit 24 can change the locations in the y direction of the dried regions SA by moving the four heat rollers 92 in the y direction.

Next, an operation of the recording system 1 of Embodiment 5 will be described.

According to the recording system 1 of Embodiment 5, a pressure is applied to the paper sheet P by nipping the paper sheet P by using the heat rollers 92 and the transportation roller 72. Thus, it is possible to enhance the rigidity of the dried regions SA on the paper sheet P as compared to the configuration in which heating alone is performed on the paper sheet P.

Figure 14:
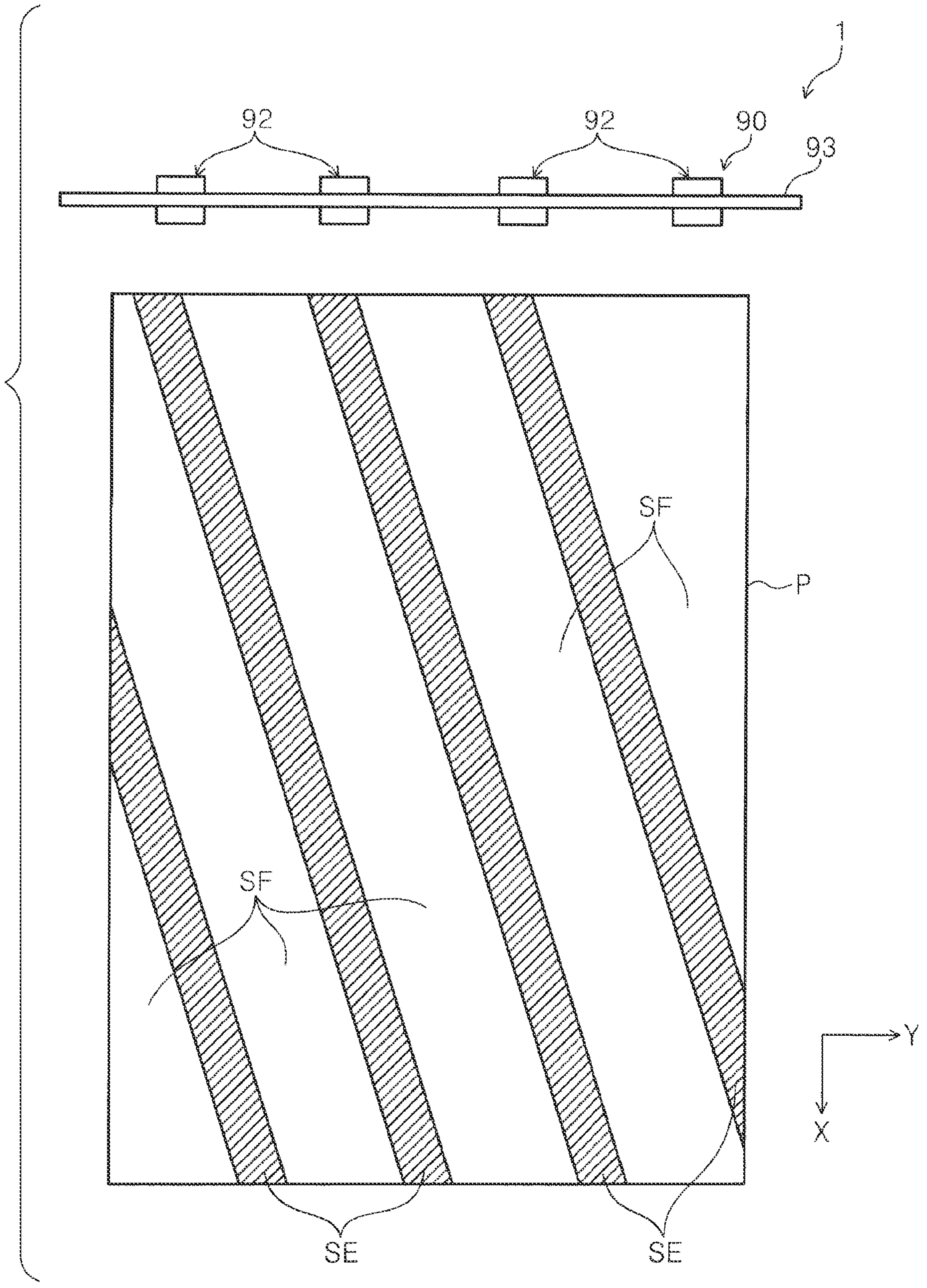
FIG. 14 is a plan view illustrating a heating unit and a paper sheet in a recording system of Modification 1 of Embodiment 5.

FIG. 14 illustrates the heating unit 90 in the recording system 1 according to Modification 1 of Embodiment 5 as well as the paper sheet P.

The four heat rollers 92 of the heating unit 90 are provided to be movable in the y direction that is the width direction orthogonal to the direction of transportation. Here, illustration of the holders 94 is omitted.

The control unit 24 (FIG. 2) controls the movement in the y direction of the four heat rollers 92 of the heating unit 90 in conformity to a location where a dried region SE is formed on the paper sheet P.

In the recording system 1 of Modification 1 of Embodiment 5, the four heat rollers 92 are collectively and gradually moved in the y direction while the paper sheet P is passed through the heating unit 90. As a consequence, the four dried regions SE and five undried regions SF are formed on the paper sheet P. Each dried region SE extends straight and in a strip shape in an oblique direction intersecting the direction of transportation. In this way, it is possible to change regions on the paper sheet P to be formed into the dried regions SE by moving the heat rollers 92 of the heating unit 90 in the y direction, and thus to deal with a case where the regions on the paper sheet P supposed to be enhanced in rigidity are altered due to a change in material of the paper sheet P and the like.

Figure 15:
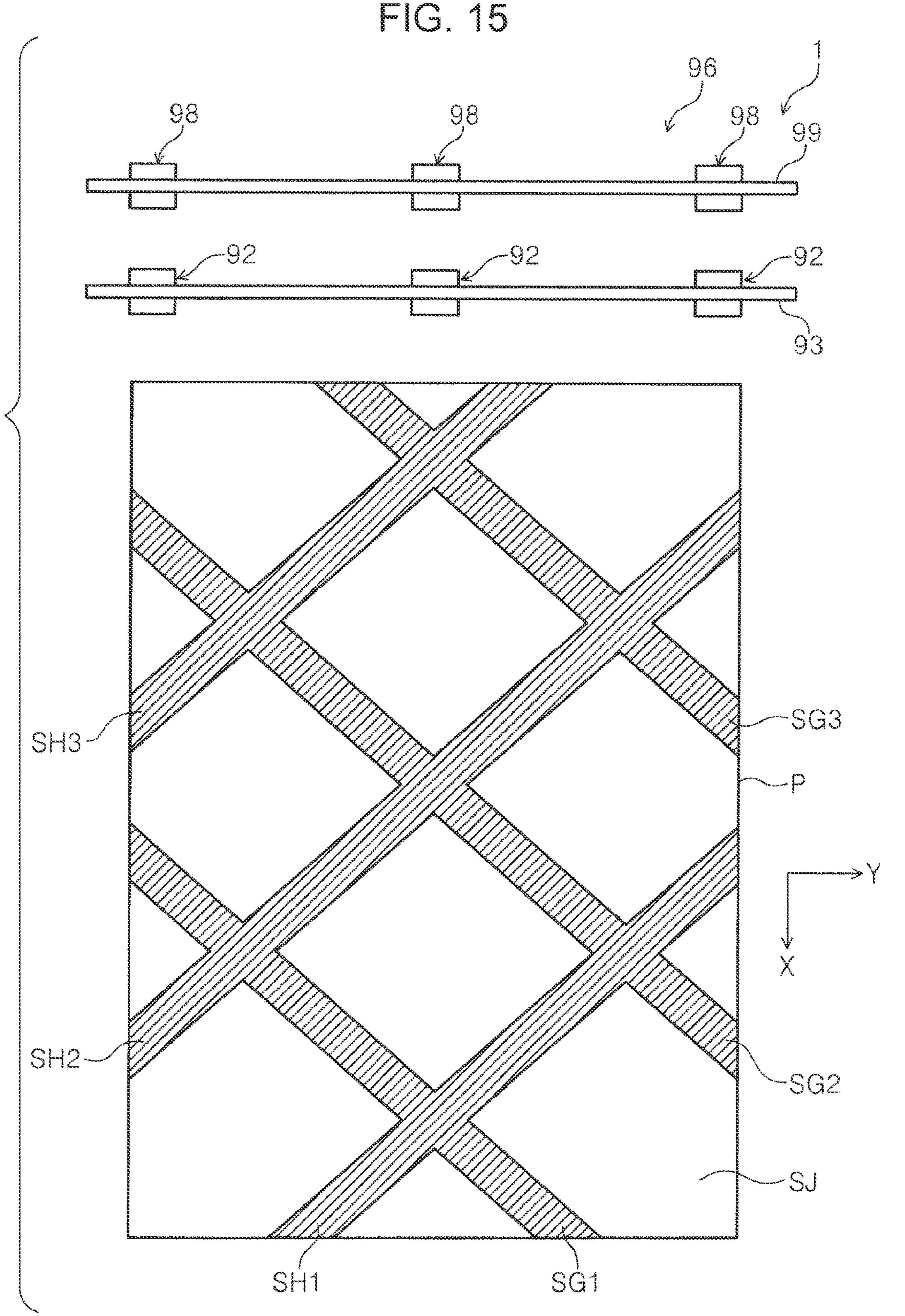
FIG. 15 is a plan view illustrating a heating unit and a paper sheet in a recording system of Modification 2 of Embodiment 5.

FIG. 15 illustrates a heating unit 96 in the recording system 1 according to Modification 2 of Embodiment 5 as well as the paper sheet P.

The heating unit 96 includes three heat rollers 92, the linear slider 93, three heat rollers 98, and a linear slider 99.

The heat rollers 98 have the same structure as the heat rollers 92 and are provided to be movable in the y direction. The linear slider 99 has the same structure as the linear slider 93. Here, illustration of the holders 94 is omitted.

The three heat rollers 92 and the linear slider 93 are located downstream of the three heat rollers 98 and the linear slider 99 in the direction of transportation. The three heat roller 92 are collectively moved in the +y direction. The three heat rollers 98 are collectively moved in the −y direction.

Dried regions SG1, SG2, SG3, SH1, SH2, and SH3 are formed on the paper sheet P by moving the three heat rollers 92 in the +y direction and moving the three heat rollers 98 in the −y direction while the paper sheet P is passed through the heating unit 96. Note that regions other than the dried regions SG1, SG2, SG3, SH1, SH2, and SH3 will be collectively referred to as an undried region SJ.

Each of the dried regions SG1, SG2, SG3, SH1, SH2, and SH3 extends straight and in a strip shape in an oblique direction intersecting the direction of transportation. The dried regions SG1, SG2, and SG3 are arranged substantially parallel to one another. The dried regions SH1, SH2, and SH3 are arranged substantially parallel to one another. The dried regions SG1, SG2, and SG3 intersect the dried regions SH1, SH2, and SH3.

Accordingly, it is possible to form the dried regions in a crosshatch pattern on the paper sheet P by heating the paper sheet P by use of the heating unit 96. The formation of the dried regions in the crosshatch pattern on the paper sheet P enhances the rigidity of the paper sheet P both in the x direction and the y direction.

Figure 16:
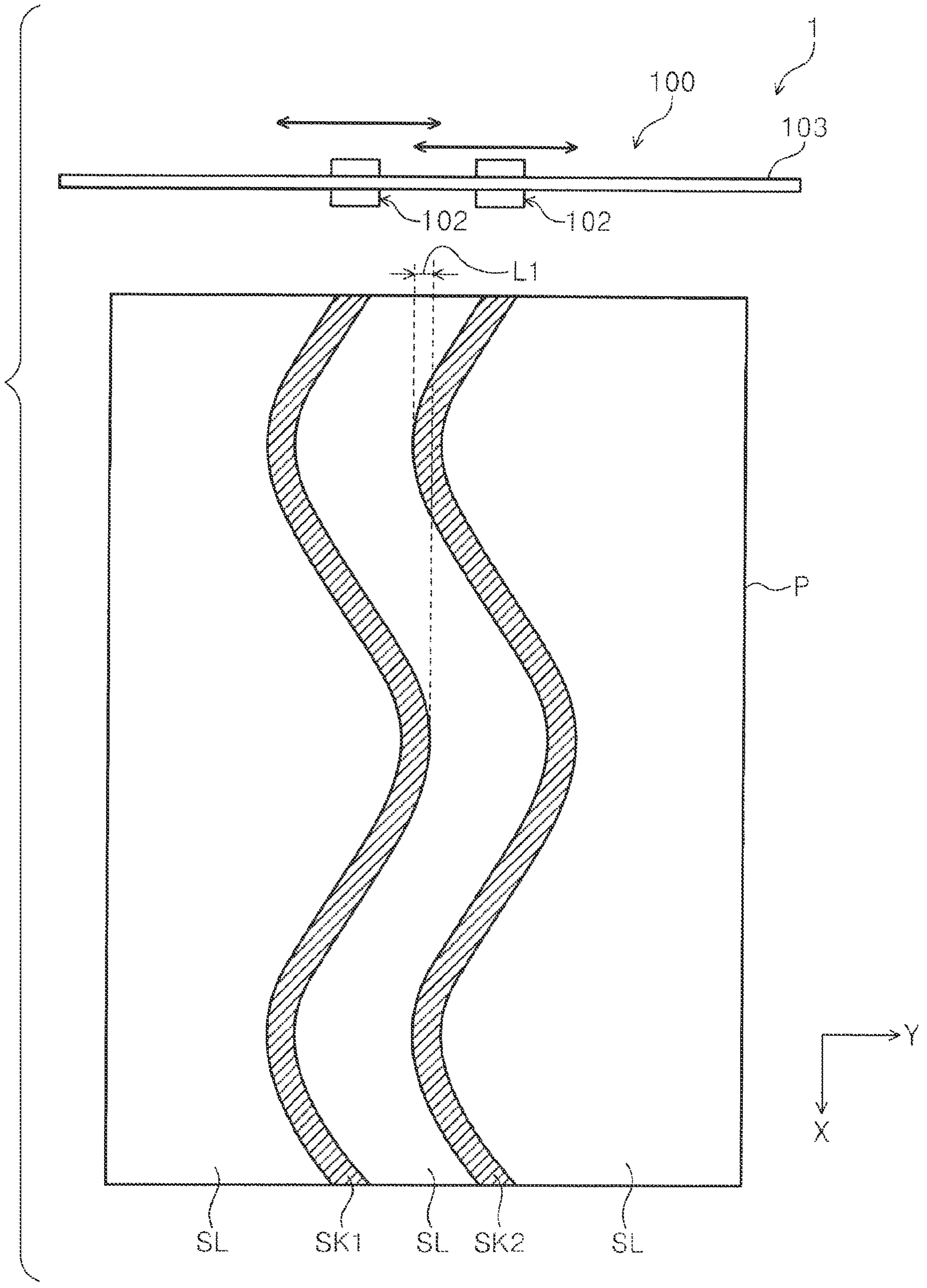
FIG. 16 is a plan view illustrating a heating unit and a paper sheet in a recording system of Modification 3 of Embodiment 5.

FIG. 16 illustrates a heating unit 100 in the recording system 1 according to Modification 3 of Embodiment 5 as well as the paper sheet P.

The heating unit 100 includes two heat rollers 102 and a linear slider 103. The two heat rollers 102 are collectively movable in the y direction, for example. Here, the two heat rollers 102 are rotatably supported by holders (not illustrated) fitted to the linear slider 103.

The two heat rollers 102 are synchronously reciprocated in the +y direction and the −y direction while the paper sheet P is passed through the heating unit 100. As a consequence, dried regions SK1 and SK2 as well as three undried regions SL are formed on the paper sheet P.

Each of the dried regions SK1 and SK2 is formed into a wavy shape that repeats peaks and troughs in the y direction as the region extends in the x direction. By forming the wavy dried regions SK1 and SK2, the rigidity of the paper sheet P is enhanced both in the x direction and the y direction.

Here, the dried region SK1 and the dried region SK2 overlap each other by a length L1 in the y direction, for example. In this overlapping region, the rigidity of the paper sheet P is further enhanced as compared to the remaining region.

Figure 17:
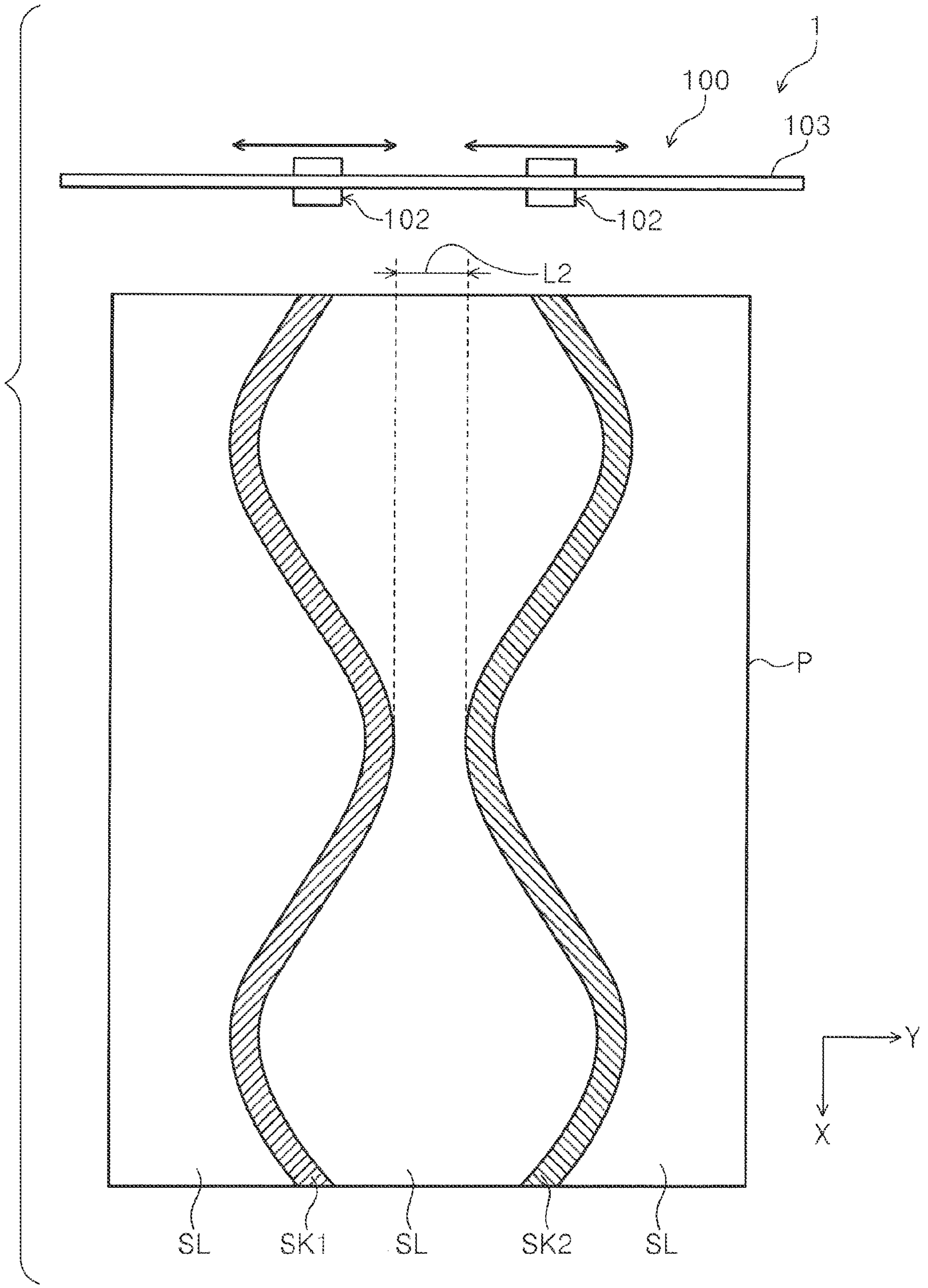
FIG. 17 is a plan view illustrating a heating unit and a paper sheet in a recording system of Modification 4 of Embodiment 5.

FIG. 17 illustrates the heating unit 100 in the recording system 1 according to Modification 4 of Embodiment 5 as well as the paper sheet P.

Unlike Modification 3, the dried region SK1, the dried region SK2, and three undried regions SL are formed by moving the two heat rollers 102 of the heating unit 100 of Modification 4 of Embodiment 5 in opposite directions to each other in the y direction.

Here, the two heat rollers 102 are moved synchronously albeit in the opposite directions. Accordingly, peak portions that protrude outward in the y direction and trough portions to be recessed inward in the y direction are located substantially at the same positions in the y direction, respectively. As a consequence, the dried region SK1 and the dried region SK2 formed on the paper sheet P are in an axisymmetric relationship with respect to a center line (not illustrated) that passes through the center in the y direction of the paper sheet P and extends in the x direction. The dried region SK1 is located away from the dried region SK2 by a length L2 in the y direction.

As described above, formation of the axisymmetric dried regions SK1 and SK2 enhances the rigidity of the paper sheet P uniformly on one side and the other side in the y direction.

Embodiment 6

Next, a recording system 1 according to Embodiment 6 will be described with reference to the accompanying drawings. Note that constituents of this embodiment which are the same as the constituents of the respective embodiments and the respective modifications described above will be denoted by the same reference signs and explanations thereof will be omitted.

The recording system 1 of Embodiment 6 has a different layout of the heating regions formed from that in the recording system 1 according to Modification 2 of Embodiment 1. The configuration except the above is basically the same as the configuration of Modification 2 of Embodiment 1.

Figure 18:
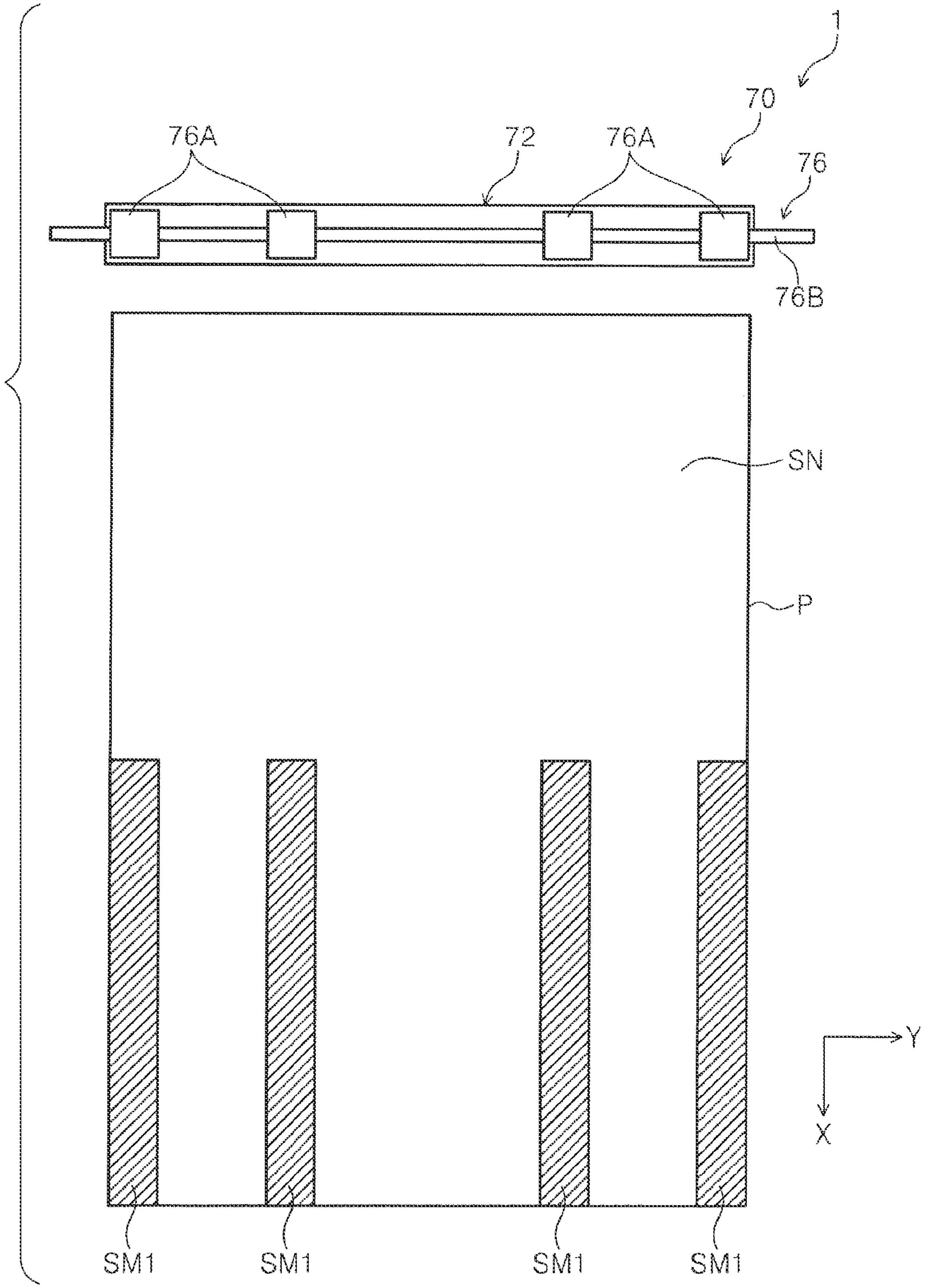
FIG. 18 is a plan view illustrating a heating unit and a paper sheet in a recording system of Embodiment 6.

In the recording system 1 of Embodiment 6 illustrated in FIG. 18, the paddle unit 61, the cursor unit 88, and the stapler 69 (FIG. 2) represent an example of the post-processing unit that performs the post-processing on the paper sheet P at the discharge unit 33.

The heating unit 70 is disposed between the ejection unit 22 and the discharge unit 33 in the direction of transportation. For example, four dried regions SM1 and one undried region SN are formed on the paper sheet P by heating using the heating unit 70.

The four dried regions SM1 and the one undried region SN are arranged in the direction of transportation. Specifically, the four dried regions SM1 are unevenly located downstream of the center in the direction of transportation of the paper sheet P. In other words, the undried region SN is unevenly located upstream of the center in the direction of transportation of the paper sheet P. Here, the four dried regions SM1 in total are located at two end portions in the y direction of the paper sheet P and at two locations at a central part thereof, respectively. Each of the four dried regions SM1 is formed into a rectangular shape in which a dimension in the X direction is longer than a dimension in the Y direction.

Next, an operation of the recording system 1 of Embodiment 6 will be described.

According to the recording system 1 of Embodiment 6, the dried regions SM1 are formed at the portion downstream in the direction of transportation of the paper sheet P. Thus, when a downstream end portion of the paper sheet P comes into contact with the discharge unit 33 or other mounting portions, it is possible to suppress buckling of the downstream end portion of the paper sheet P since the rigidity against the force in the direction of transportation is enhanced at that portion.

Embodiment 7

Next, a recording system 1 according to Embodiment 7 will be described with reference to the accompanying drawings. Note that constituents of this embodiment which are the same as the constituents of the respective embodiments and the respective modifications described above will be denoted by the same reference signs and explanations thereof will be omitted.

The recording system 1 of Embodiment 7 has a different layout of the heating regions formed from that in the recording system 1 according to Modification 2 of Embodiment 1. The configuration except the above is basically the same as the configuration of Modification 2 of Embodiment 1.

Figure 19:
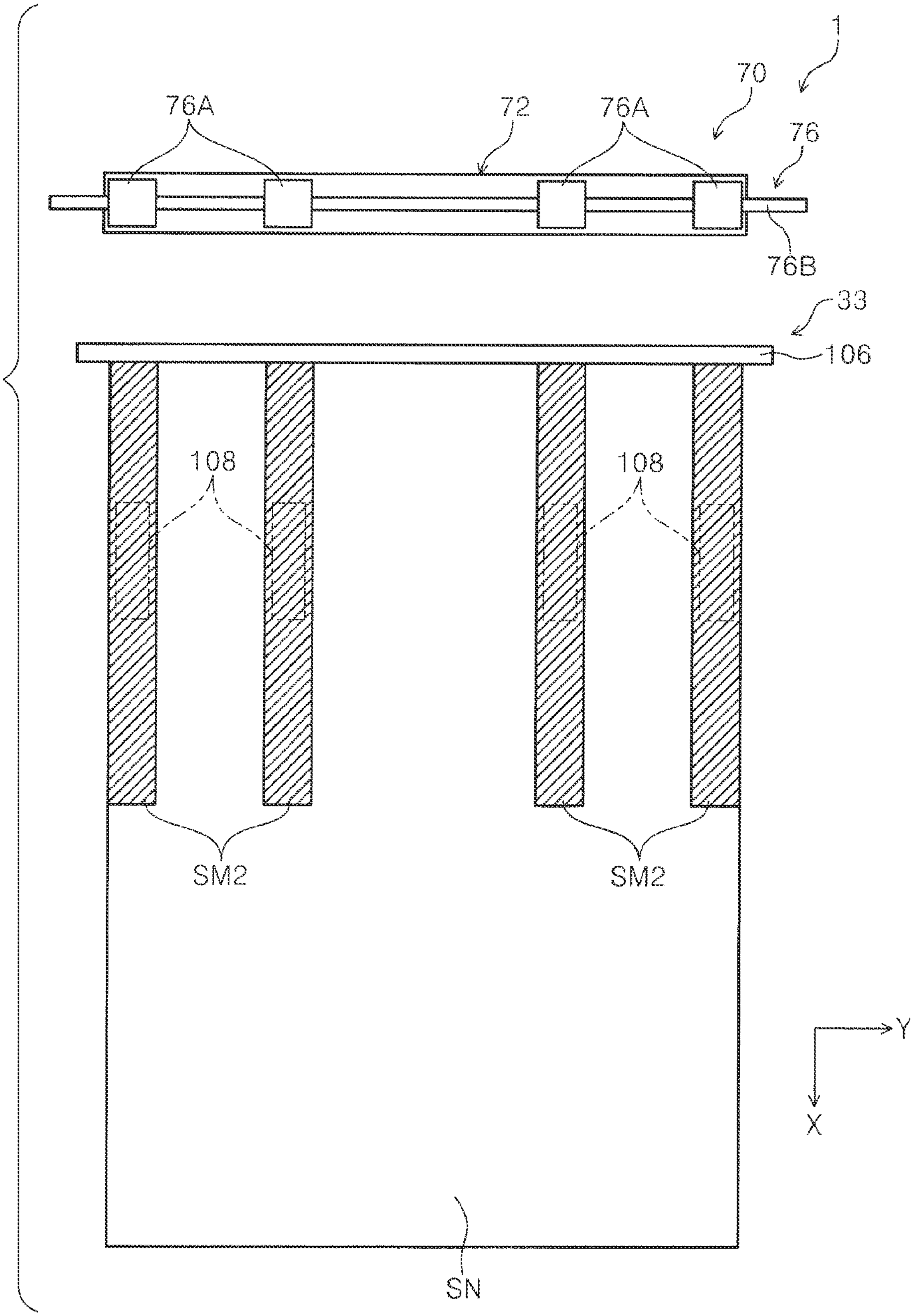
FIG. 19 is a plan view illustrating a heating unit and a paper sheet in a recording system of Embodiment 7.

In the recording system 1 of the Embodiment 7 illustrated in FIG. 19, the stapler 69 (FIG. 2) represents an example of the post-processing unit that performs the post-processing on the paper sheet P at the discharge unit 33.

The heating unit 70 is disposed between the ejection unit 22 and the discharge unit 33 in the direction of transportation. For example, four dried regions SM2 and one undried region SN are formed on the paper sheet P by heating using the heating unit 70.

The four dried regions SM2 and the one undried region SN are arranged in the direction of transportation. Specifically, the four dried regions SM2 are unevenly located upstream of the center in the direction of transportation of the paper sheet P. In other words, the undried region SN is unevenly located downstream of the center in the direction of transportation of the paper sheet P. Here, the four dried regions SM2 in total are located at two end portions in the y direction of the paper sheet P and at two locations at a central part thereof, respectively. Each of the four dried regions SM2 is formed into a rectangular shape in which a dimension in the x direction is longer than a dimension in the Y direction.

The discharge unit 33 is provided with one alignment plate 106 and four paddles 108, for example.

The alignment plate 106 is located upstream in the direction of transportation of the discharge unit 33. The alignment plate 106 has a predetermined thickness in the direction of transportation, and extends in the y direction. The alignment plate 106 aligns upstream end portions in the direction of transportation of the paper sheets P.

The four paddles 108 collectively constitute the paddle unit 61 (FIG. 1). The four paddles 108 are disposed at intervals in the y direction. The paddles 108 pull the paper sheet P at the discharge unit 33 back to the upstream in the direction of transportation and bring the paper sheet P into contact with the alignment plate 106.

The control unit 24 (FIG. 2) controls the operation to heat the paper sheet P by the heating unit 70 in the direction of transportation and in the y direction such that each of the dried regions SM2 includes one of the four locations where the paddles 108 are in contact in the z direction with the paper sheet P discharged to the discharge unit 33.

Next, an operation of the recording system 1 of Embodiment 7 will be described.

According to the recording system 1 of Embodiment 7, the dried regions SM2 are formed at the upstream portion in the direction of transportation of the paper sheet P. Hence, it is possible to suppress buckling of the upper end portion of the paper sheet P when the upper end portion of the paper sheet P comes into contact with the alignment plate 106 since the rigidity of the paper sheet P against the force in the direction of transportation is enhanced.

According to the recording system 1 of Embodiment 7, the locations where the paddles 108 are in contact with the paper sheet P are included in the dried regions SM2, whereby the rigidity of the regions on the paper sheet P that are in contact with the paddles 108 is enhanced. As a consequence, it is possible to suppress buckling of the paper sheet P even when the load to be applied from each paddle 108 to the paper sheet P is increased.

The recording system 1, the method for controlling the recording system 1, and the non-transitory computer-readable storage medium storing the program for controlling the recording system 1 according to the respective embodiments from the Embodiments 1 to 7 as well as the respective modifications thereof of the present disclosure basically have the above-described configurations. However, it is of course possible to carry out alteration, combination, omission, and the like of part of the configuration within the range not departing from the scope of the disclosure of the present application.

The recording system 1 of Embodiment 1 may include only one of the temperature sensor 21 and the humidity sensor 23. The discharge unit 33 may or may not be provided with the recesses 37 or the protrusions 35.

When the information to be recorded on the paper sheet P requires a low recording density, the amount of ejection V of the ink Q from the ejection unit 22 is low. In this case, it is possible to perform control without involving the heating of the paper sheet P.

A first roller pair that can form a dried region and a second roller pair that can form only an undried region may both be provided. Then, it is possible to carry out control by using the first roller pair in a drying mode while using the second roller pair in a non-drying mode.

The transportation route K may be provided with a switchback route for transporting the paper sheet P in a switchback mode for duplex printing. Moreover, the switchback route is provided with a heating unit to heat the paper sheet P, and a measurement unit to measure an amount of entry of the paper sheet P to the switchback route. Hence, it is possible to switch modes between a mode to perform heating while operating the heating unit in a case of a large amount of entry of the paper sheet P measured by the measurement unit and a mode not to perform heating in a case of a small amount of entry of the paper sheet P.

Multistage control may be carried out while setting two or more temperature thresholds and two or more humidity thresholds, respectively. Then, the heating quantity of the paper sheet P may be changed depending on respective temperature ranges and respective humidity ranges. When there is one temperature threshold, the temperature may be controlled only by turning the heater on and off. When changing the heating quantity and the amount of ejection, these parameters may be changed independently of each other.

The CPU 25 may determine whether or not the heating by the heating unit 40 is necessary, or whether or not the heating quantity needs to be changed without using the amount of ejection V estimated by the ejection amount estimation unit 28. Alternatively, the CPU 25 does not have to carry out these determinations regardless of the amount of ejection V estimated by the ejection amount estimation unit 28. The CPU 25 may execute the respective steps in order to form the undried regions SB and the dried regions SA on the paper sheet P without using the amount of ejection V estimated by the ejection amount estimation unit 28. In this case, the amount of ejection V estimated by the ejection amount estimation unit 28 will be used for driving the ejection unit 22.

The mechanism for attaching and detaching the heat rollers to and from the transportation roller is not limited to the motor and the cam, and a solenoid may be used instead.

The method of blowing hot air to the paper sheet P may be designed to change a position to blow out the hot air by using the shutter members or to move an air outlet itself in the y direction.

The movement of the heat rollers in the width direction may apply a combination of an endless belt, a pulley, and a motor, or may apply a solenoid.

The sheet is not limited only to the paper sheet P but may be any of a film, a cloth, and the like.

Each punching member 54 may have a contour that forms the shape of the through hole A into a shape other than a circular shape.

The number of the through holes A is not limited only to two. It is possible to provide one through hole A or three or more through holes A.

The number of the dried regions, the number of the undried regions, and the number of locations subject to a change in heating quantity for each paper sheet P may be set to different numbers from the numbers cited in the respective embodiments.

What is claimed is:

1. A liquid ejecting apparatus comprising:
- a transportation unit that transports a sheet in a direction of transportation;
- an ejection unit that ejects a liquid to the sheet;
- a heating unit that heats the sheet to which the liquid is ejected;
- a discharge unit to which the heated sheet is discharged; and
- a control unit that controls, based on information inputted, the transportation unit, the ejection unit, and the heating unit, wherein
- the control unit specifies an amount of ejection of the liquid from the ejection unit, controls an operation of the heating unit such that an undried region where the liquid on the sheet is not dried and a dried region where the liquid on the sheet is dried as compared to the liquid in the undried region are formed on the sheet, and controls a transporting operation by the transportation unit such that the sheet on which the dried region and the undried region are formed is discharged to the discharge unit; and
- wherein the control unit changes the amount of ejection of the liquid from the ejection unit depending on a capacity of the heating unit.

2. The liquid ejecting apparatus according to claim 1, wherein
- the control unit changes a heating quantity from the heating unit depending on the amount of ejection of the liquid from the ejection unit.

3. The liquid ejecting apparatus according to claim 1, wherein
- the dried region and the undried region are arranged in a width direction orthogonal to the direction of transportation.

4. The liquid ejecting apparatus according to claim 1, wherein
- the dried region and the undried region are arranged in the direction of transportation.

5. The liquid ejecting apparatus according to claim 4, further comprising:
- a post-processing unit that performs post-processing on the sheet at the discharge unit, wherein
- the heating unit is disposed between the ejection unit and the discharge unit in the direction of transportation, and
- the dried region is unevenly located downstream of a center in the direction of transportation of the sheet.

6. The liquid ejecting apparatus according to claim 4, wherein
- the discharge unit includes an alignment plate provided upstream in the direction of transportation and configured to align an end portion of the sheet, a paddle is disposed to pull the sheet at the discharge unit back to upstream in the direction of transportation and cause the sheet to be in contact with the alignment plate, a post-processing unit is disposed to perform post-processing on the sheet at the discharge unit, the heating unit is disposed between the ejection unit and the discharge unit in the direction of transportation, and the dried region is unevenly located upstream of a center in the direction of transportation of the sheet.

7. The liquid ejecting apparatus according to claim 6, wherein the control unit controls an operation to heat the sheet by the heating unit such that a location where the paddle is in contact with the sheet is included in the dried region in the direction of transportation and in a width direction orthogonal to the direction of transportation.

8. The liquid ejecting apparatus according to claim 1, wherein the heating unit is configured to move in a width direction orthogonal to the direction of transportation, and the control unit controls movement in the width direction of the heating unit in conformity to a location where the dried region is formed on the sheet.

9. The liquid ejecting apparatus according to claim 1, wherein the control unit executes, based on control information inputted, any one of an operation to change a location of the dried region in the direction of transportation or a width direction orthogonal to the direction of transportation, and an operation to change whether or not to heat by the heating unit.

10. The liquid ejecting apparatus according to claim 9, wherein the heating unit includes a heat roller configured to be attached to and detached from the sheet, and the control unit performs, based on the control information, control to switch between contact and noncontact of the heat roller with the sheet.

11. The liquid ejecting apparatus according to claim 10, wherein the heating unit includes a roller that nips the sheet in conjunction with the heat roller, and the control unit changes the location of the dried region in the width direction by moving one of the heat roller and the roller in the width direction.

12. The liquid ejecting apparatus according to claim 1, further comprising:

a shearing unit that performs a shearing process on the sheet, wherein the control unit causes the dried region to be formed in a region on the sheet where the shearing process is carried out by the shearing unit, and causes the undried region to be formed in a region on the sheet where the shearing process is not carried out by the shearing unit.

13. The liquid ejecting apparatus according to claim 1, wherein the transportation unit includes a rotor that transports the sheet downstream of the heating unit in the direction of transportation, and the rotor is located inside the dried region when the rotor is projected onto the sheet.

14. The liquid ejecting apparatus according to claim 1, wherein the discharge unit includes a cursor configured to move in a width direction orthogonal to the direction of transportation, the cursor moves the sheet at the discharge unit in the width direction by being in contact with the sheet, and the control unit causes the dried region to be formed at a portion in the direction of transportation of the sheet from one end to another end in the width direction.

15. The liquid ejecting apparatus according to claim 1, further comprising:

a temperature measurement unit that measures a temperature inside the apparatus, wherein the control unit does not operate the heating unit when the temperature measured by the temperature measurement unit is higher than a temperature threshold.

16. The liquid ejecting apparatus according to claim 1, further comprising:

a humidity measurement unit that measures a humidity inside the apparatus, wherein the control unit does not operate the heating unit when the humidity measured by the humidity measurement unit is lower than a humidity threshold.

17. The liquid ejecting apparatus according to claim 1, wherein the discharge unit includes a recess and a protrusion which are arranged in a width direction orthogonal to the direction of transportation, the protrusion is opposed to the dried region on the sheet, and the recess is opposed to the undried region on the sheet.

18. A method for controlling a liquid ejecting apparatus including a transportation unit that transports a sheet in a direction of transportation, an ejection unit that ejects a liquid to the sheet, a heating unit that heats the sheet to which the liquid is ejected, a discharge unit to which the heated sheet is discharged, and a control unit that controls, based on information inputted, the transportation unit, the ejection unit, and the heating unit, the method comprising:

specifying an amount of ejection of the liquid from the ejection unit;

ejecting the liquid from the ejection unit to the sheet;

controlling an operation to heat the sheet by the heating unit such that an undried region where the liquid on the sheet is not dried and a dried region where the liquid on the sheet is dried as compared to the liquid in the undried region are formed on the sheet;

controlling a transporting operation by the transportation unit such that the sheet on which the dried region and the undried region are formed is discharged to the discharge unit; and changing the amount of ejection of the liquid from the ejection unit depending on a capacity of the heating unit.

19. A non-transitory computer-readable storage medium storing a program for controlling a liquid ejecting apparatus including a transportation unit that transports a sheet in a direction of transportation, an ejection unit that ejects a liquid to the sheet, a heating unit that heats the sheet to which the liquid is ejected, a discharge unit to which the heated sheet is discharged, and a control unit that controls, based on information inputted, the transportation unit, the ejection unit, and the heating unit, the program causing a computer to execute a process comprising:

specifying an amount of ejection of the liquid from the ejection unit; ejecting the liquid from the ejection unit to the sheet;

controlling an operation to heat the sheet by the heating unit such that an undried region where the liquid on the sheet is not dried and a dried region where the liquid on the sheet is dried as compared to the liquid in the undried region are formed on the sheet;

controlling a transporting operation by the transportation unit such that the sheet on which the dried region and the undried region are formed is discharged to the discharge unit; and changing the amount of ejection of the liquid from the ejection unit depending on a capacity of the heating unit.

* * * * *